US00RE42732E

(19) United States
(12) Reissued Patent
Zittel et al.

(10) Patent Number: US RE42,732 E
(45) Date of Reissued Patent: Sep. 27, 2011

(54) ROTARY BLANCHER FOR PROCESSING FOOD PRODUCT

(75) Inventors: David R. Zittel, Columbus, WI (US); Steven W. Hughes, Beaver Dam, WI (US); Daniel D. Maupin, Corvallis, OR (US)

(73) Assignee: Lyco Manufacturing, Inc., Columbus, WI (US)

(21) Appl. No.: 10/791,695

(22) Filed: Mar. 2, 2004

Related U.S. Patent Documents

Reissue of:
(64) Patent No.: 6,234,066
Issued: May 22, 2001
Appl. No.: 09/727,122
Filed: Nov. 30, 2000

U.S. Applications:
(62) Division of application No. 09/419,716, filed on Oct. 14, 1999, now Pat. No. 6,214,400.

(51) Int. Cl.
*A23L 3/00* (2006.01)
*A23N 12/00* (2006.01)
*A47J 37/12* (2006.01)
*F25D 25/02* (2006.01)

(52) U.S. Cl. ..... 99/348; 99/355; 99/404; 99/409; 99/443 C; 99/517

(58) Field of Classification Search ..... 99/348, 99/360, 365, 450, 470, 352–355, 403–409, 99/483, 487, 516, 517, 534, 536, 477–479, 99/443 R, 443 C; 366/81, 91, 101, 102, 144–149, 366/234, 290, 322, 324, 318, 319; 134/132, 134/65; 62/381, 375, 374, 63, 64; 100/117, 100/145; 426/509–511, 520–523
See application file for complete search history.

(56) References Cited

U.S. PATENT DOCUMENTS
697,272 A 4/1902 Plummer
(Continued)

FOREIGN PATENT DOCUMENTS
DE 1274428 8/1968
(Continued)

OTHER PUBLICATIONS
Blueprint of Hughes blancher dated Jun. 16, 1997 of its 1997 blancher installation at Campbell Soup's factory in Listowel, Canada.

*Primary Examiner* — Reginald L Alexander
(74) *Attorney, Agent, or Firm* — George R. Corrigan

(57) ABSTRACT

A method and rotary blancher for processing food product using a heat transfer medium and directed flows of a fluid that can comprise a liquid, a gas, a vapor or a combination thereof. The directed flows can be discharged from orifices or banks of orifices that are distributed around the food products in the blancher. The flows are discharged at a high flow rate, a high pressure, or a combination of both. Where a liquid is discharged, it preferably is discharged at a flow rate of at least 20 gpm and at least 30 psi. Where a gas is discharged, it is discharged at a flow rate of at least 60 CFM at a pressure of at least 2 psi or at a flow rate of at least 10 CFM at a pressure of at least 80 psi. If desired, discharged fluid can be recirculated to save energy. To help increase agitation and help break up clumps of food products in the blancher, direct-contact mechanical agitation devices, such as baffles, can be used. Such a blancher and method can be used to process food product by blanching, cooking and pasteurizing, is suited for processing relatively heavy food products having a density of at least 55 lbs/ft$^3$ using discharged liquid and gas, and is suited for processing food products having a lesser density using only discharged gas.

43 Claims, 9 Drawing Sheets

U.S. PATENT DOCUMENTS

| | | | | | |
|---|---|---|---|---|---|
| 1,168,799 | A | | 1/1916 | Grier | |
| 1,231,002 | A | | 6/1917 | Dawson | |
| 1,290,396 | A | | 1/1919 | Steere | |
| 1,581,933 | A | | 4/1926 | Larsen | |
| 1,609,705 | A | | 12/1926 | Forrest | |
| 1,806,957 | A | | 5/1931 | Stocking | |
| 2,166,197 | A | * | 7/1939 | Schaub | 99/458 |
| 2,299,080 | A | | 10/1942 | DeBack | |
| 2,314,871 | A | | 3/1943 | De Back | |
| 2,418,519 | A | | 4/1947 | McBeth | |
| 2,585,293 | A | | 2/1952 | Ashton | |
| 2,805,639 | A | | 9/1957 | Martin | |
| 2,909,872 | A | * | 10/1959 | Kearney et. al. | 134/132 |
| 3,086,444 | A | | 4/1963 | De Back | |
| 3,135,668 | A | * | 6/1964 | Wesson | 435/291.8 |
| 3,420,157 | A | | 1/1969 | Frish | |
| 3,484,360 | A | * | 12/1969 | Sandrock | 204/213 |
| 3,722,401 | A | | 3/1973 | Davidson et al. | |
| 3,760,714 | A | | 9/1973 | Lortz | |
| 3,982,481 | A | | 9/1976 | Console et al. | |
| 4,238,997 | A | | 12/1980 | Hengstenberg | |
| 4,525,370 | A | | 6/1985 | Parkes | |
| 4,688,476 | A | | 8/1987 | Zittel | |
| 4,875,344 | A | | 10/1989 | Zittel | |
| 4,942,810 | A | | 7/1990 | Zittel et al. | |
| 4,949,629 | A | | 8/1990 | Leary et al. | |
| 5,133,249 | A | | 7/1992 | Zittel | |
| 5,173,122 | A | | 12/1992 | Tilby et al. | |
| 5,284,085 | A | | 2/1994 | Palm | |
| 5,289,759 | A | | 3/1994 | Hufford | |
| 5,327,817 | A | | 7/1994 | Zittel | |
| 5,329,842 | A | | 7/1994 | Zittel | |
| 5,341,729 | A | | 8/1994 | Zittel | |
| 5,427,015 | A | | 6/1995 | Zittel | |
| 5,429,041 | A | | 7/1995 | Zittel | |
| 5,456,091 | A | | 10/1995 | Zittel | |
| 5,517,906 | A | | 5/1996 | Zittel et al. | |
| 5,589,214 | A | | 12/1996 | Palm | |
| 5,592,869 | A | | 1/1997 | Zittel | |
| 5,632,195 | A | | 5/1997 | Zittel | |
| 5,669,288 | A | | 9/1997 | Zittel et al. | |
| 5,752,431 | A | | 5/1998 | Zittel | |
| 5,802,961 | A | | 9/1998 | Hay et al. | |
| 6,095,035 | A | | 8/2000 | Zittel et al. | |
| 6,105,485 | A | | 8/2000 | Zittel | |
| 6,205,913 | B1 | | 3/2001 | Zittel et al. | |
| 6,263,785 | B1 | | 7/2001 | Zittel | |

FOREIGN PATENT DOCUMENTS

| | | | |
|---|---|---|---|
| DE | 2161446 | | 3/1973 |
| GB | 769456 | | 3/1957 |
| GB | 814871 | | 6/1959 |
| GB | 814872 | | 6/1959 |
| GB | 909015 | | 10/1962 |
| WO | 01/26483 | A1 | 4/2001 |
| WO | 2004/110229 | A2 | 12/2004 |

* cited by examiner

ROTARY BLANCHER FOR PROCESSING FOOD PRODUCT

Matter enclosed in heavy brackets [ ] appears in the original patent but forms no part of this reissue specification; matter printed in italics indicates the additions made by reissue.

This application is a divisional application of Ser. No. 09/419,716, filed Oct. 14, 1999 [pending] *now U.S. Pat. No. 6,214,400.*

FIELD OF THE INVENTION

The present invention relates to rotary blanchers and more particularly to a method and rotary blancher for processing food products that comprises introducing a fluid into the heat transfer medium in the blancher to more efficiently and more uniformly heat the food products in the blancher and which can be used to blanch, cook or pasteurize the food products.

BACKGROUND OF THE INVENTION

A wide variety of food products, such as pasta, beans, corn, peas, and other vegetables and fruit, are processed every day around the world by blanching or heating. For many years, the basic rotary blancher consisted of an elongate cylindrical perforate drum received in a tank filled with heated water. Food products are continuously introduced through an inlet in one end of the drum and heated by the water in the tank. During operation, flights of a helical auger in the drum rotate and urge the food products from the drum inlet toward a drum outlet.

However, food products tend to clump together as the drum rotates resulting in poor heat transfer and uneven heating, especially for those food products in the middle of the clump. To combat this problem, straight and curved baffles have been employed between adjacent flights of the auger to lift and tumble food product during rotation of the drum to help improve heat transfer and more evenly heat food product. Examples of such baffles are disclosed in Zittel, U.S. Pat. Nos. 5,632,195 and 5,456,091. As a result of this improvement, blanching capacity was not only roughly doubled, but the food products were more uniformly blanched. For example, where nine inches of one specific type of food product could previously be blanched, a blancher equipped with these baffles could more uniformly blanch about eighteen inches of the same food product.

In addition to this type of mechanical agitation, other methods have also been employed to improve heat transfer. For example, as is disclosed in Zittel, U.S. Pat. Nos. 5,752,431 and 5,632,195, air and steam have been introduced into the water in the tank to help increase heat transfer efficiency. Air has also been used to improve cooling efficiency in food cooling applications. For example, U.S. Pat. No. 4,875,344 discloses injecting relatively low volumes of low-pressure air, namely warm air into cold water, to improve cooling of food products in a rotary drum chiller. In some food product cooling applications, manifolds connected to nozzles that introduce the air into the chiller have been located between the tank and drum at the five o'clock and seven o'clock positions relative to the drum's center. However, in each of these applications, the air was injected at a pressure of no greater than 150 pounds per square inch (psi) at a flow rate no more than 25 cubic feet per minute (CFM).

Directed flows of water have also been used to increase heat transfer. For example, U.S. Pat. No. 5,456,091 discloses improved cooling by directing flows of water from nozzles connected to a manifold toward the drum to agitate food products in the drum. However, a relatively low volume of water of no more than 8 gallons per minute per foot of blancher length (gpm/ft) at a pressure no greater than 40 psi was used for these cooling applications. While directed flows of water have also been tried in blanchers to improve heat transfer, it has been done using pressures no greater than 8 psi and flow rates no greater than 10 gpm/ft.

It is believed that greater pressures and flow rates of directed water flows have not been tried before because the lower pressures and flow rates previously tried did not increase efficiency so dramatically as to predict a correspondingly greater efficiency increase. Moreover, the cost of bigger and more powerful pumps and other equipment needed to deliver greater flow rates, particularly at higher pressures, was thought to be so cost prohibitive that any possible performance advantage was believed not to be worth it.

It has always been very difficult for rotary blanchers to process food products that are relatively heavy, typically having a density greater than 55 pounds per cubic foot (lbs/ft$^3$). Examples of food products that are relatively heavy include packaged meats, such as hot dogs and turkey breasts, as well as other types of food products that are not packaged. While baffles have been used to help turn over and agitate food products during operation, heavier food products tend to clump together on the bottom and along the side of the rotating drum where the drum leaves the water. This is believed to be caused, at least in part, by the increased weight of the food products causing them to sink and by the increased friction between the food products and the rotating drum.

Testing has shown that, most, if not virtually all, heavy food products congregate along one side of the drum near the bottom of the drum in a region that occupies less than about 20% of the total volume of the drum dramatically reducing the amount of food product surface area actually exposed directly to the hot water. By congregating in a clump, the food products inside the clump are not heated directly by the water but by other outer food products, which means it takes more time to heat all of the food products to the desired temperature than is acceptable. Other experiments have shown that these lower turbulence (i.e. lower volume and pressure) flows of air and water used in the past, even if the blancher is equipped with agitating baffles, will not break up and agitate heavy food products enough to achieve the desired level of heat transfer needed to make blanching of heavy food products commercially viable.

Pasta is a relatively heavy food product that has a density less than 55 lbs/ft$^3$. Pasta, however, is relatively fragile and must be handled much more carefully during blanching than most other types of food products, which has limited attempts in the past to increase heat transfer. Past attempts to increase heat transfer include the use of baffles and the introduction of air having a pressure no greater than 2 psi at a volume no greater than 40 CFM per foot of blancher length. As a result, throughput for a 72-inch diameter blancher has been heretofore limited to about 3500 pounds of pasta per hour, making production undesirably slow.

While the food processing industry has always been driven to find ways of processing more food product faster, it has been more recently been tempered by the need to do so in a manner that ensures the food is not contaminated. Thus, there has been a move to not only heat the food products until they are cooked, but to pasteurize the food products which takes longer, requires more heat, and thus is more costly.

Consequently, there has arisen a great need for a method and rotary blancher that processes food products, including heavy and fragile food products, more efficiently and more quickly and which is capable of more cost-effectively cooking, blanching and pasteurizing food products.

SUMMARY OF THE INVENTION

A rotary blancher and method of processing food products by heating are provided. The blancher and method uses a heat transfer medium and heat transfer enhancers that include one or more of a high volume fluid, a high pressure fluid, or a high pressure and high volume fluid. In its preferred embodiment, the blancher includes a housing that has an inlet and an outlet and a food product-receiving chamber. Food products enter through the inlet, are received and heated in the food product-receiving chamber, and exit through the outlet. A rotary food product transport mechanism urges food products received in the chamber toward the outlet. While inside the chamber, a heat transfer medium heats the food products preferably to blanch, cook or pasteurize them. The heat transfer medium can be a liquid, such as water, or another fluid that can comprise a vapor, if desired.

In a preferred embodiment, the housing is comprised of a tank and preferably includes a cover that can be attached to the tank in a clamshell arrangement. The rotary food product transport mechanism preferably comprises an auger or screw disposed in the tank and which is made of helical spaced apart flights. If desired, one or more of the flights can carry one or more mechanical agitation devices, such as generally radially extending baffles. Preferably, the auger is disposed in a perforate drum that is received in the blancher housing. An exemplary blancher of the aforementioned construction has a length that typically is four feet or longer.

The blancher includes a plurality of orifices that discharge fluid into the heat transfer medium. In one embodiment, the discharged fluid forms directed flows that help break up food products and help prevent food products from clumping together. One or more flows of fluid can be directed at one or more locations within the blancher where food products tend to gather to break up clumps as well as to prevent clumping.

In another embodiment, there is a plurality of spaced apart manifolds that each has at least a plurality of orifices through which fluid is discharged. One or more manifolds can be disposed below the lid in communication with the tank in a quadrant of the tank adjacent the direction of rotation of the auger. Preferably, the manifolds are spaced apart. One or more manifolds, or groups of orifices, can be disposed around the periphery of the auger at or adjacent one or more of the following positions: 3 o'clock, 4 o'clock, 5 o'clock, 6 o'clock, 7 o'clock, 8 o'clock, and 9 o'clock positions. In another preferred arrangement, one or more manifolds, or groups of orifices, are located between at least one or more of the following positions: between 3 o'clock and 4 o'clock, between 4 o'clock and 5 o'clock, between 5 o'clock and 6 o'clock, between 5 o'clock and 7 o'clock, between 6 o'clock and 7 o'clock, between 7 o'clock and 8 o'clock and/or between 8 o'clock and 9 o'clock.

In a still further preferred embodiment, one or more manifolds or groups of orifices can be disposed between 3 o'clock and 5 o'clock or lie within a band located between 45° and 65° from a perpendicular drum centerline in a direction opposite the direction of drum rotation (measured from the center of the drum and centerline). One or more manifolds or groups of orifices can be disposed between 4 o'clock and 6 o'clock or lie within a band located between 25° and 40° from the centerline in a direction opposite the direction of drum rotation. One or more manifolds or groups of orifices can be disposed between 5 o'clock and 7 o'clock or lie within ±25° of the centerline. One or more manifolds or groups of orifices can be disposed between 6 o'clock and 8 o'clock or lie within a band located between 25° and 40° from the centerline in a direction the same as the direction of drum rotation. One or more manifolds or groups of orifices can be disposed between 7 o'clock and 9 o'clock or lie within a band located between 45° and 65° from the centerline in a direction the same as the direction of drum rotation.

The fluid discharged can comprise liquid, such as water, or gas, such as air. If desired, vapor, such as steam or water vapor, can be discharged. Liquid can be discharged from one or more groups each comprising one or more orifices, and/or gas can be discharged from one or more different groups each comprising one or more orifices. If desired, vapor can be discharged from one or more groups of one or more orifices.

Where liquid is discharged, it preferably is either discharged at a high flow rate, a high pressure, or both. For example, where liquid is discharged, it preferably is discharged at a flow rate of at least 20 gallons per minute (gpm) at a pressure of at least 30 psi. Where liquid is discharged at a higher flow rate, the liquid is discharged at a flow rate of at least 60 gpm. Preferably, at least 60 gpm per foot (gpm/ft) of blancher length is discharged. In another preferred method, at least 80 gpm per minute is discharged. Where liquid is discharged at a higher pressure, it preferably is discharged at a pressure of at least 80 psi. Where the pressure is at least 80 psi, at least 20 gpm/ft preferably is discharged.

Where gas is discharged, it preferably is either discharged at a high flow rate, a high pressure, or both. For example, where gas is discharged, it preferably is discharged at a flow rate of at least 60 CFM at a pressure of at least 2 psi. In another preferred method, the gas is discharged at a higher flow rate of at least 100 CFM. Preferably, at least 100 CFM per foot (CFM/ft) of blancher length is discharged. In still another preferred method, the gas is discharged at an even higher flow rate of at least 200 CFM. Preferably, at least 200 CFM/ft is discharged. Where gas is discharged at a high pressure, it preferably is discharged at a pressure of at least 80 psi. Where the pressure is at least 80 psi, at least 10 CFM/ft is discharged.

If desired, vapor, such as steam, can be discharged from one or more of the orifices at the above-mentioned gas flow rates and pressures. Where steam is discharged, it preferably is discharged from each orifice at a flow rate of at least 20 pounds per hour (lbs/hr) at a discharge flow rate of at least 15 psi.

In one preferred method, high pressure, high volume or high pressure and high volume liquid and gas is discharged into a liquid heat transfer medium to help in the processing of relatively heavy food products having a density of at least 55 lbs/ft$^3$. Such food products include hot dogs, pouched hot dogs, meats, pouched meats, and other heavier food products. If desired, one or more flights carry one or more direct-contact mechanical agitation devices that can be radially extending baffles. Discharging such liquid and gas, a blancher can process at least eight inches of depth of such relatively heavy food product, and preferably at least twelve inches of depth of the food product, in the food product receiving chamber. Discharging such liquid and gas, a blancher can process at least 8000 lbs/hr of food product, and preferably at least 10000 lbs/hr of food product. Preferably, the food product-receiving chamber is disposed in the drum that surrounds the auger.

In another preferred method, high pressure, high volume, or high pressure, high volume gas is discharged into a liquid heat transfer medium to help in the processing of food products having a density of no more than 55 lbs/ft$^3$ and to help process more fragile food products. An example of such a food product that is relatively fragile is pasta. Preferably, none of the flights are equipped with direct-contact mechanical agitation devices. Discharging such gas, a blancher can process at least eight inches of depth of food product, and preferably at least twelve inches of depth of food product, in the food product-receiving chamber. Discharging such gas, a blancher can process at least 4500 lbs/hr of food product, and preferably at least 7000 lbs/hr of food product.

In another preferred embodiment and method, heat transfer medium and atmosphere within a blancher can be withdrawn and returned to the blancher in the form of gas, vapor and/or liquid discharged through one or more the orifices. Where the fluid is recirculated, a pump such as a liquid-ring vacuum pump or compressor is used to withdraw fluid from the blancher through a conduit and deliver the withdrawn fluid to one or more orifices or one or more manifolds.

It is an object of the present invention to utilize higher pressure directed flows of fluid inside the blancher to increase turbulence and heat transfer to the food products inside the blancher.

It is another object of the present invention to utilize higher flow rate directed flows of fluid inside the blancher to increase turbulence and heat transfer to the food products inside the blancher.

It is still another object of the present invention to utilize higher pressure and higher flow rate directed flows of fluid inside the blancher to increase turbulence and heat transfer to the food products inside the blancher.

It is a still further advantage of the present invention to utilize at least some of the heat transfer medium and/or atmosphere from within the blancher as a source of the directed fluid flows.

It is an advantage of the present invention to utilize higher flow rate and/or higher pressure directed flows of gas inside the blancher to increase the buoyancy of food products inside the blancher to prevent them from gathering near the bottom.

It is another advantage of the present invention to increase the amount of food products that can be substantially simultaneously processed at one time.

It is an additional advantage of the present invention to prevent food products in the blancher from clumping together with other food products.

It is a still another advantage of the present invention to significantly increase the rate of food product processing.

It is a further advantage of the present invention to reduce and preferably substantially completely prevent damage to fragile food products, such as pasta.

It is another advantage of the present invention to increase the amount of fragile food products that can be substantially simultaneously processed at one time.

It is a still another advantage of the present invention to significantly increase the rate of processing of relatively fragile food products.

It is another advantage of the present invention to increase the amount of relatively heavy food products that can be substantially simultaneously processed at one time.

It is a still another advantage of the present invention to significantly increase the rate of processing of relatively heavy food products.

It is a further advantage of the present invention to reduce and preferably substantially completely prevent damage to relatively heavy food products, such as hot dogs and turkey breasts.

Other advantages, features and objects of the present method is that it saves processing time, increases production, is economical, is versatile in that it can be employed in the blanching, cooking or pasteurizing of food products, is capable of recirculating the discharged fluids to save energy, and is simple, reliable, easy to control, and can be used to help process many different types of food products.

Additional objects, features and objects of the invention include a blancher that is simple, reliable, rugged, durable, and which is of economical construction and which is easy to make and assemble.

Other objects, features, and advantages of the present invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

At least one preferred exemplary embodiment of the invention is illustrated in the accompanying drawings in which like reference numerals represent like parts throughout and in which.

DETAILED DESCRIPTION

Figure 1:
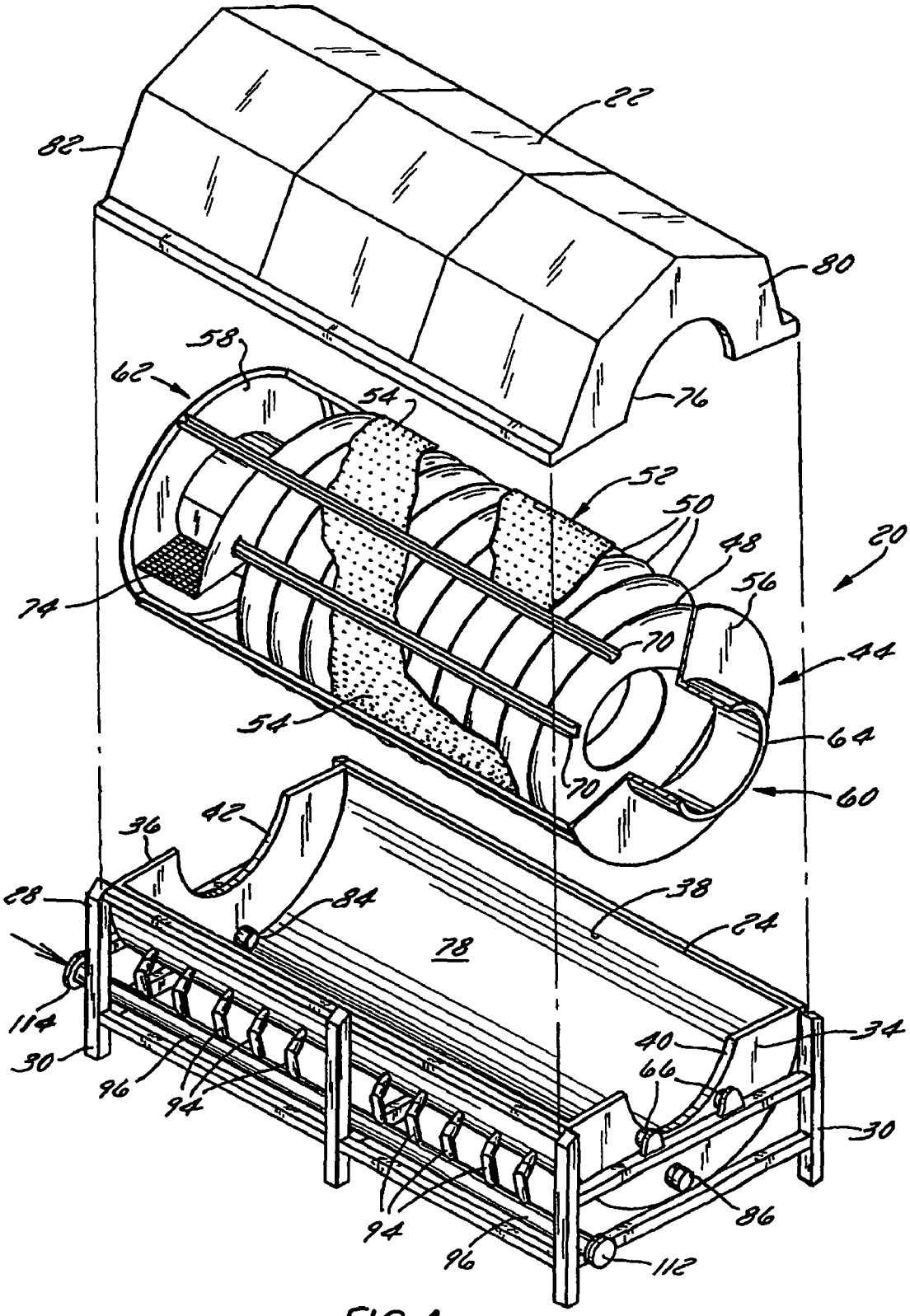
FIG. 1 is an exploded perspective view of a rotary blancher of this invention.

FIGS. 1-4 illustrate an exemplary rotary blancher 20 of this invention that utilizes directed flows of a fluid during operation to enhance heat transfer. As is shown more clearly in FIG. 6, the blancher 20 is comprised of a housing that includes a cover 22 that mates with a tank 24 that holds a heated fluid, that preferably is a liquid 26, which heats food products 32 during operation. The tank 24 is supported by a frame 28 that has legs 30, which rest on the floor or ground.

The tank 24, preferably made of stainless steel or another material suitable for food processing applications, has an inlet endwall 34 and an outlet endwall 36. The endwalls 34 and 36 are joined to a tank underside 38 that defines the bottom and lengthwise sides of the tank 24. The tank underside 38 may be a single, continuous, curved plate running lengthwise between endwalls 34 and 36, or may be made of several long flat plates positioned side by side and angularly joined together to form a generally curved shape. Each endwall 34 and 36 has a through opening, 40 and 42 respectively, that preferably is arcuate or semicircular.

A food product transport mechanism 44 is received within the blancher 20 and preferably is disposed between the tank underside 38 and cover 22. The food product transport mechanism 44 is constructed and arranged to transport food products 32 received in the blancher 20 toward the blancher outlet 62. In its preferred embodiment, the food product transport mechanism 44 comprises an auger or helical screw 48 received within the blancher 20 and which rotates during operation to urge food products 32 received in the blancher 20 toward the outlet 62.

The auger 48 has a plurality of pairs of axially spaced apart and interconnected flights 50 and extends substantially the length of the interior of the tank 24. Preferably, the auger 48 has at least four flights and can have as many as twenty flights or more depending upon the application and length of the blancher 20. While the auger flights 50 can be carried by an elongate generally cylindrical central support core 51 (FIG. 3), the auger 48 can be of a coreless construction, such as is shown in FIGS. 1 and 2.

Preferably, the auger 48 is housed in a drum 52. The drum 52 has a sidewall 54, an inlet endwall 56, an outlet endwall 58, and inlet and outlet openings 60 and 62, through which food products 32 are introduced into the blancher 20 and discharged from the blancher 20. Annular drum journals 64 extend from each end of the drum 52 beyond each drum endwall 54 and 56. Each journal 64 provides a support surface upon which the weight of the drum 52 can rest particularly while it rotates during operation. Preferably, each drum journal 64 is rotatively supported on trunnions 66 which are mounted to the frame 28 and which are positioned so that the weight of the drum 52 does not rest upon the tank endwalls 34 and 36.

The drum 52 is constructed and arranged to receive food products 32 and a heat transfer medium 33 (FIG. 3) such that the heat transfer medium 33 can surround and contact the food products 32 within the drum 52 during operation. In its preferred embodiment, the drum 52 is of perforate construction. For example, the drum sidewall 54 can be constructed with a plurality of perforations 68 and is preferably made of perforated panels, mesh, or a screen-like material in order to contain the food products 32 in the drum 52 while at the same time permitting the heat transfer medium 33 to enter the interior of the drum, preferably through the perforations 68, to contact the food products 32.

Figure 2:
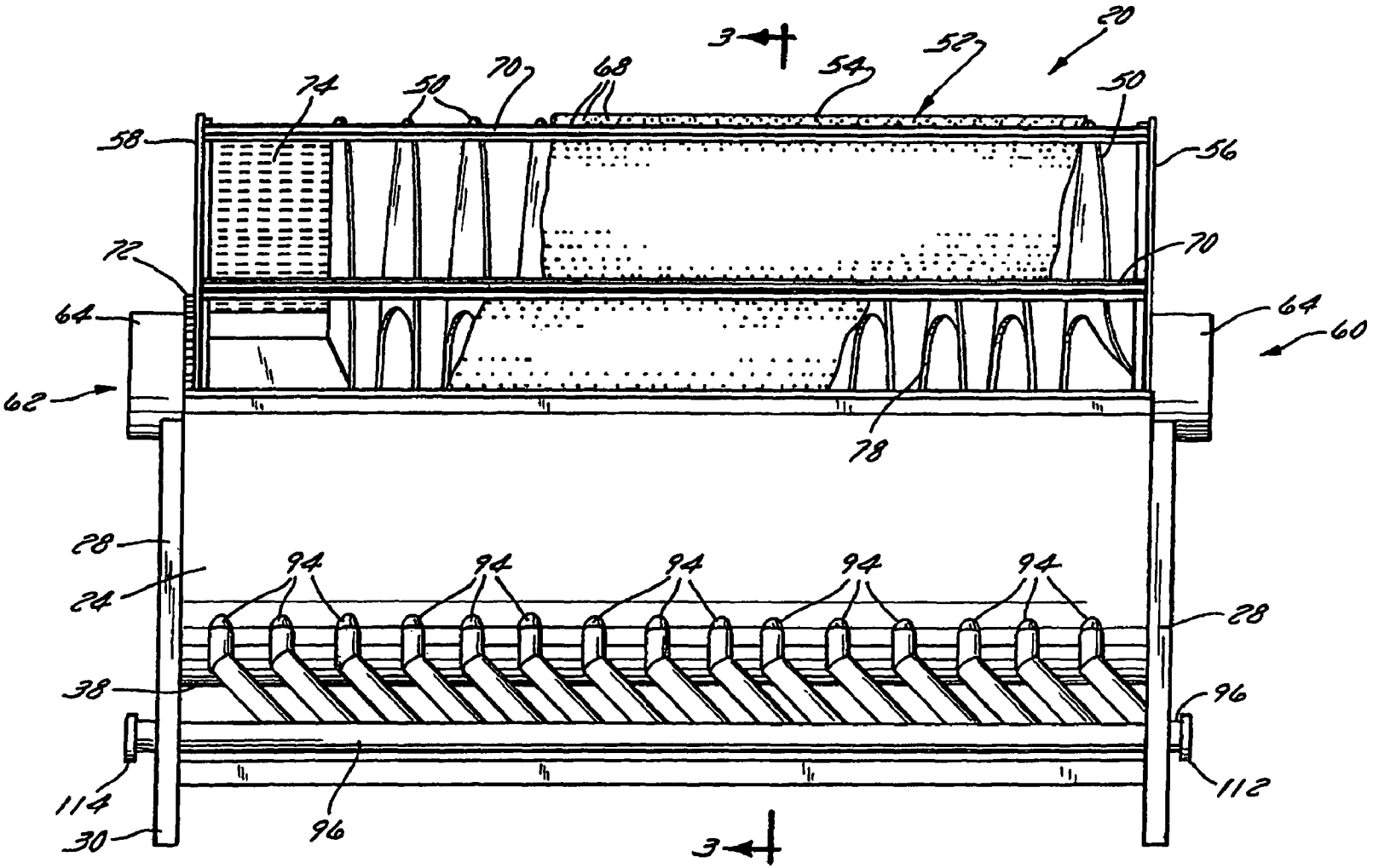
FIG. 2 is a side view of the rotary blancher with a section broken away.

Each of the perforations 68 in the portion of the drum sidewall 54 shown in FIG. 2 is exaggerated for clarity. Preferably, the perforations 68 are constructed and arranged to permit heat transfer medium 33 to flow through the sidewall 52 into or out of the drum 50 while retaining the food product 42 in the drum 50. Depending on the type of food product 32 being processed, the size and shape of the perforations 68 can vary. Preferably, the size of each perforation 68 can range from as small as 1/16 of an inch, for relatively small food product, such as rice, to as large as ½ inch or more for larger food products, such as hot dogs or the like. The sizes of the perforations preferably are selected using routine testing and experimentation to help maximize the flow of the directed flows of fluid through the drum sidewall 54.

Particularly where the auger 48 is of coreless construction, the drum 52 can be constructed with circumferentially spaced apart elongate struts 70 that preferably extend from one end wall 56 to the other end wall 58 to help strengthen and rigidify the drum 52 and auger 48. These struts 68 can also serve as mounts to which the panels that make up the perforate drum sidewall 54 can be fastened. Preferably, the panels are removably fastened to the struts 68.

In its preferred embodiment, the cover 22 is of preferably elongate and vaulted construction so as to fit over and completely cover the tank 24 so as to provide an enclosure for receiving the heat transfer medium 33 and a food product receiving chamber for receiving the food products 32. The cover 22 has a pair of endwalls 80 and 82 and each endwall has a semi-circular opening 76. When the cover 22 is closed, one of the openings 76 is positioned above one of the openings 40 in tank endwall 34 and the other one of the openings 76 is positioned above the other one of the openings 42 in tank endwall 36. When closed, one of the drum journals 64 extends out from openings 76 and 42 and the other one of the journals 64 extends out from openings 76 and 40.

The cover 22 can be attached to the tank 24 in a manner such that it can be moved relative to the tank 24 to permit access to the interior of the blancher 20. The cover 22 can be attached to the tank 24 by one or more hinges such that it may be opened along one side of the blancher 20. If desired, the cover 22 can be attached to the tank 24 such that it can be lifted free of the tank 24 using cylinders or the like, such as in the manner disclosed in U.S. Pat. No. 4,788,476 to Zittel, the disclosure of which is hereby incorporated by reference.

The blancher 20 preferably also has an inlet 84 permitting introduction of the heat transfer medium 33 into the tank 28 and an outlet 86 through which the heat transfer medium 33 can be drained. If desired, there can be a constant flow of heat transfer medium 33 into and out of the blancher 20 through the inlet 84 and outlet 86. The outlet 84 and 86 can also assist in cleaning the interior of the tank 24.

During operation, the auger 48 is rotated to urge the food products 32 through the blancher 20. Preferably, both the auger 48 and the drum 52 rotate. If desired, the auger 48 and drum 52 can be constructed such that the auger 48 rotates relative to or independently of the drum 52. While use of a drum 52 is preferred, depending upon the construction of the tank 24, as well as other components of the blancher 20, and the food processing application, a drum 52 may not be needed.

In one preferred embodiment, the drum 52 and auger 48 are driven by a motor (not shown) which transfers power via a geartrain, belt, or chain (also not shown) to a drive sprocket 72 carried by either of the drum journals 64. The drum 52 preferably rotates at a speed selected to achieve the desired cooking time for the type of food product 32, its weight, the amount being processed, and other factors, thereby controlling its residency time within the blancher 20 and thus its time of exposure to the heat transfer medium 33.

When one or more of the food products 32 in the blancher 20 reaches the outlet 62, each food product 32 is lifted and transferred to the outlet 62 where it is expelled out of the blancher 20. A single generally radially extending lifting flight 74, or more than one, can be used to transfer the food products 32 to the outlet 62. Of course, other suitable arrangements can be used to remove food product 32 from the blancher 20.

Figure 3:
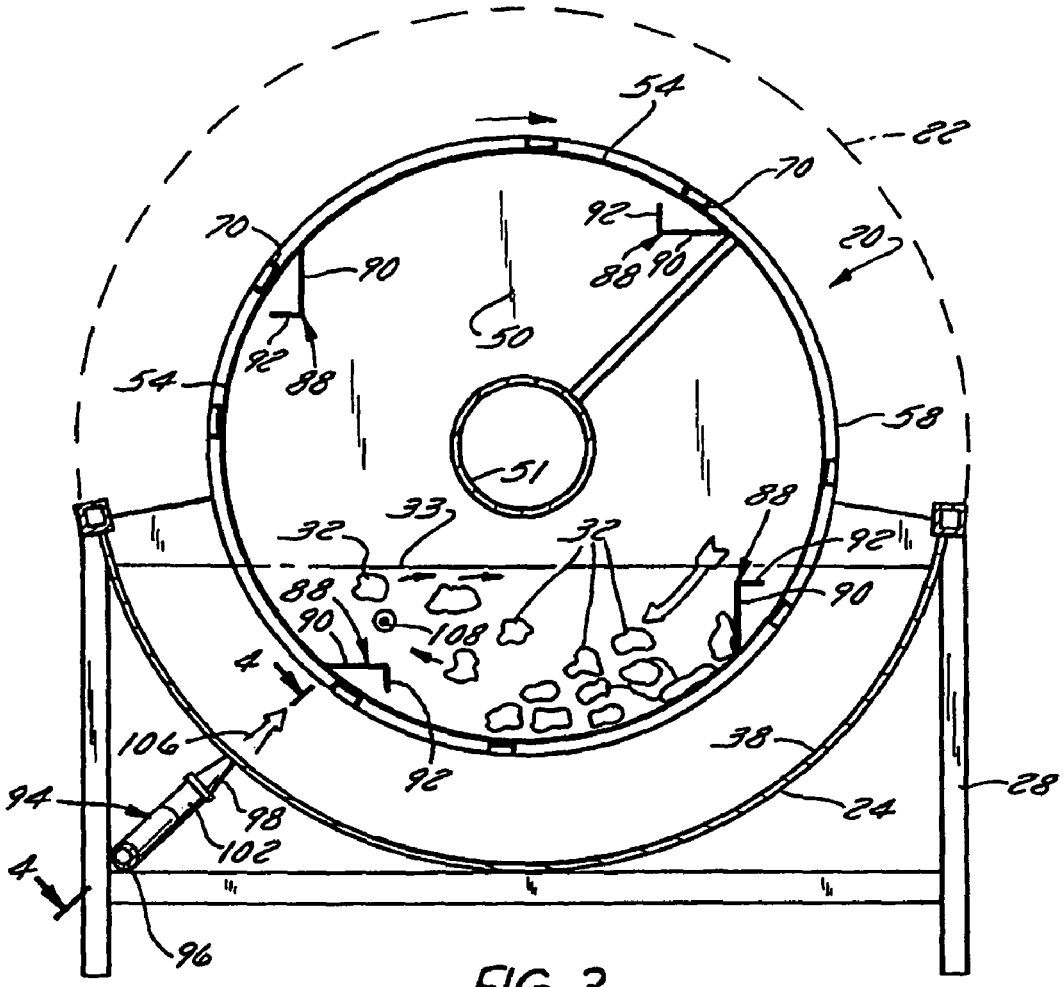
FIG. 3 is a sectional view of the blancher taken along line 3-3 of FIG. 2 with its cover removed and depicting an orifice from which fluid is being injected toward food products in a drum of the blancher.

Referring to FIG. 3, to help agitate food products 32 and help break up food products 32 that have clumped together, a baffle or ramp 88, carried by at least one of the auger flights 50 and/or the drum sidewall 54, can physically contact individual food products 32. In a preferred embodiment shown in FIG. 4, the baffle 88 comprises a plate 90 that extends between adjacent auger flights 50. Preferably, the baffle 88 forms an acute vee with the drum sidewall 54 that has its apex pointed in the direction of rotation of the drum 52. One end of the baffle 88 is located adjacent the drum sidewall 54 and preferably is disposed against the sidewall 54 or close enough to the sidewall 54 such that food products 32 will not get caught between the drum 52 and baffle 88. If desired, the free end of each baffle 88 can be equipped with a lip 92, preferably for preventing damage to food products 32 as they tumble off the plate 90.

In one preferred embodiment, each baffle 90 forms an acute angle of between about 5° and about 35° with the drum sidewall 54 for helping to efficiently physically contact, lift and agitate food products 32 that come into contact with the baffles. In another preferred embodiment, particularly where the food products 32 are heavy, each baffle 90 forms an acute angle of between about 30° and about 45° with the sidewall 54.

Preferably, there are between one and four circumferentially spaced apart baffles between at least one pair of adjacent flights 50. Preferably, there are between one and four baffles between each pair of adjacent auger flights 50. In the preferred embodiment shown, each baffle is of substantially flat construction. In another preferred embodiment, the baffle is of non-straight construction and preferably is curved. If desired, the baffle can further comprise bars or posts that extend outwardly from the plate.

The baffles 88 orbit the center of the drum 52 as the drum rotates. After entering the heat transfer medium 33, each baffle 88 wedges between one or more food products 32 near the drum sidewall 54 or near the bottom of the drum 52 and urges the food products 32 away from the sidewall 54. As the drum 52 further rotates, the food products 32 slide or tumble along the baffle 88 until each food product 32 falls or tumbles off of the baffle 88. In doing so, food products 32 that have gathered along the bottom of the drum 52 are lifted and mixed with the heat transfer medium. As a result of this mechanical agitation by physical contact, clumps of food products 32 are broken up and heat transfer is increased.

The blancher 20 is equipped with a plurality of pairs of orifices 94 (at least three orifices 94) from which directed flows, jets, or streams of a fluid are discharged into the tank 24 to displace food products 32 in the drum 52 to help increase heat transfer. The orifices 94 are connected to a common manifold 96 that is in turn connected to a source of fluid (not shown). In one preferred embodiment, the fluid source comprises a source of liquid, preferably a source of water. In another preferred embodiment, the fluid source comprises a source of gas, preferably a source of air.

Figure 4:
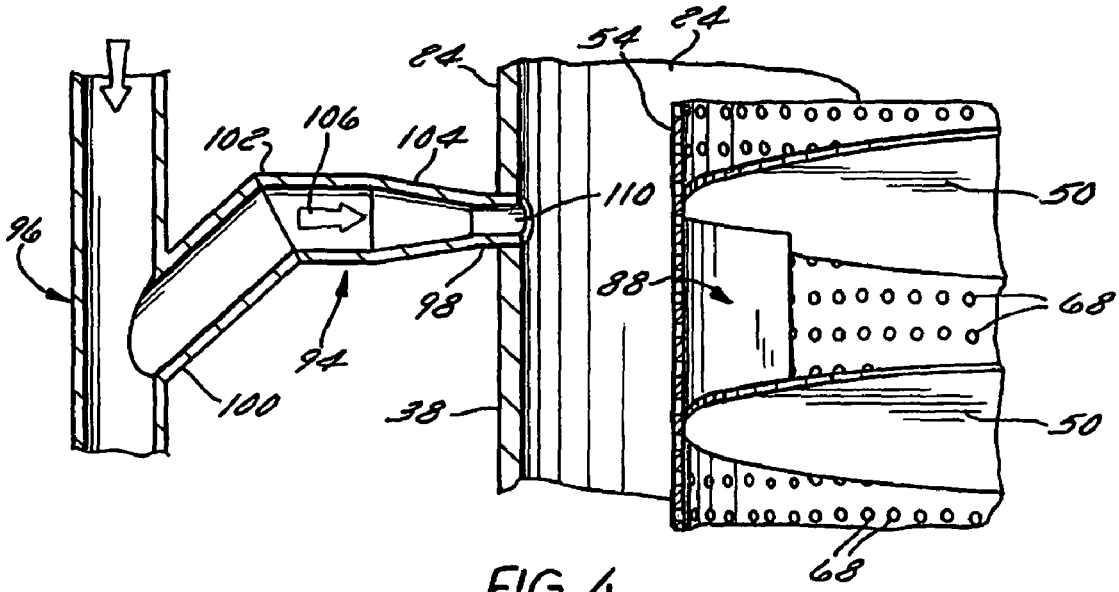
FIG. 4 is a sectional view of the orifice and blancher taken along line 4-4 of FIG. 3.

As is depicted in FIG. 4, each orifice 94 can include a nozzle 98, if desired. In the exemplary orifice arrangement shown in FIG. 4, the orifice 94 includes a first conduit 100 connected at an angle to a second conduit 102 attached to a necked down or tapered section 104 from which the nozzle 98 extends. The orifice 94 extends through or communicates with an opening in the tank bottom 38 to enable a flow 106 of the fluid to be directed toward the drum 52 with enough force such that at least some of the fluid flow 106 passes through the perforations 68 in the drum sidewall 54 and impinges against food products 32 in the drum 52 causing at least some of the food products 32 to be displaced.

Referring to FIG. 1, the manifold 96 has a plurality of pairs of orifices 94 that each direct fluid flow 106 into the drum 52. In a preferred embodiment, there is at least one orifice 94 for each auger flight 50. In another preferred embodiment, there are at least two orifices for each auger flight 50. For example, for at least a portion of the axial length of the blancher 20 shown in FIG. 2, there are two orifices 94 for each auger flight 50. Each orifice 94 is disposed between a pair of adjacent auger flights 50. If desired, two or more orifices 94 can be disposed between a pair of adjacent auger flights 50 with one or more of the orifices 94 being directed toward one or both of the flights 50. While an orifice 94 can be located anywhere between adjacent auger flights 50, at least one orifice 94 can be located adjacent the auger flight 50 of the adjacent pair that is located closest to the blancher inlet 60 for agitating food products 32 being contacted and urged by that flight 50.

In one preferred embodiment, orifices 94 are located between the 6 o'clock and 9 o'clock position when the drum 52 is rotating in the clockwise direction, such as is the direction depicted in FIG. 3. Thus, in this preferred embodiment, orifices 94 direct flows 106 into the heat transfer medium 33 in the quadrant of the drum 52 adjacent or along where the drum sidewall 54 leaves the heat transfer medium 33 during rotation. Where rotation is opposite to that shown in FIG. 3 (i.e., counterclockwise), the orifices 94 are located between 3 o'clock and 6 o'clock.

In one preferred embodiment, orifices 94 are positioned to aim flows 106 toward the drum interior and preferably generally toward the center of the drum 52. In another preferred embodiment, at least a plurality of orifices 94 are aimed at a target point 108 where food products 32 tend to conglomerate while the drum 52 is rotating. Such a point 108 can be determined by routine testing and experimentation and its location will depend upon, among other factors, the type, size, shape, weight, and amount of the food product 32 being processed.

Figure 5:
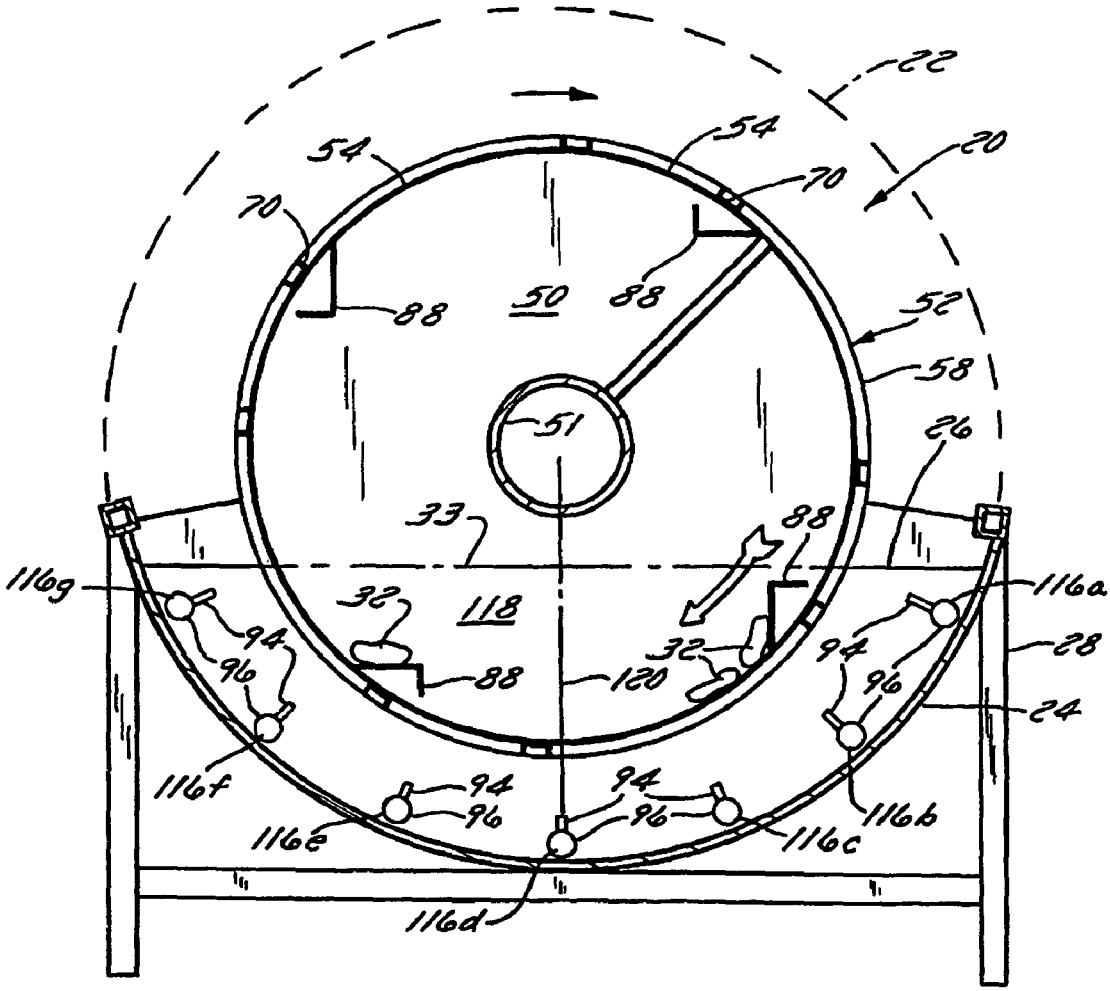
FIG. 5 is a sectional view of another preferred blancher embodiment.

While the manifold 96 and at least a portion of the orifices 94 can be disposed outside the tank 52, such as in the manner depicted in FIGS. 3 and 4, the orifices 94, and if desired, the manifold 96, can be disposed inside the tank 24, such as is depicted in FIG. 5, so that fluid flows 106 are expelled from the orifices 94 more closely to the food products 32 to more vigorously displace and agitate them. Where the manifold 96 and orifices 94 are disposed outside the tank 24, the location of each orifice 94 from which the fluid flows 106 are discharged is no farther than about twelve inches away from the outside of the drum sidewall 54. Where located outside the tank 24, the discharge opening 110 (FIG. 4) of each orifice 94 can be disposed in the tank 24 and preferably is located no farther away than six inches from the sidewall 54. Where orifices 94 are disposed inside the tank 24, a discharge opening of each in-tank orifice 94 is located closer than six inches because typically there is no more than about six inches between the tank 24 and drum sidewall 54. Where orifices 94 are disposed inside the tank 24, they preferably have discharge openings 110 located between about three inches and about one inch away from the sidewall 54. In one preferred embodiment, the discharge opening 110 of each in-tank orifice 94 is located about two inches away from the sidewall 54.

Where a liquid is being expelled from the orifices 94, the liquid is expelled at a flow rate of at least 60 gpm/ft to more vigorously agitate and displace food products 32. Preferably, the liquid is expelled from each orifice 94 at a flow rate of at least 20 gpm. In another preferred embodiment, the liquid is expelled from each orifice 94 at a flow rate of at least 60 gpm. Preferably, the liquid is expelled from each orifice 94 at a pressure of at least about 30 psi.

In another preferred method that can be dependent upon the type of food product being processed, liquid is expelled from the orifices 94 at a pressure of at least about 40 psi at a flow rate of at least about 80 gpm/ft. Preferably, the liquid is expelled from each orifice 94 at a flow rate of at least about 80 gpm. If desired, higher-pressure water having a pressure of at least 80 psi and a flow rate of at least 20 gpm/ft can be used. Preferably, at least 20 gpm is discharged from each orifice that is discharging water.

Where a liquid is being expelled, the opening of each orifice 94 can be as large as about ½ inch. Where round pipe is used, the pipe opening or outlet can have as large as ½ inch inside diameter.

Where a gas is expelled from the orifices 94, the gas preferably is expelled at a flow rate of at least 100 CFM/ft. Preferably, the gas is discharged at a flow rate of 60 CFM from each orifice. Preferably, the gas is discharged at a pressure of at least 2 psi. In another preferred method that can be dependent on the type of food product being processed, the gas preferably is expelled at a pressure of at least 2 psi at a flow rate of no less than about 200 CFM/ft. In a still further preferred method, higher-pressure gas having a pressure of at least 60 psi and a flow rate of 10 standard cubic feet per minute per foot (SCFM/ft) of blancher length is used. In this instance, the flow rate discharged from each orifice is at least 10 CFM.

Where a gas is being expelled, the orifice opening can be as large as about ¼ inch. Where round pipe is used, the pipe opening or outlet can have as large as ⅛ inch inside diameter.

If desired, vapor, such as steam, can also be discharged from one or more of the orifices 94 at the above-mentioned gas flow rates and pressures. Where steam is discharged, it preferably is discharged from one or more orifices at a flow rate of at least 20 pounds per hour from each orifice discharged at a discharge flow rate of at least 15 psi.

Where water is the liquid being expelled, one or more centrifugal-type water pumps can be used to achieve the aforementioned high flow rates and high pressures. If desired, one or more positive displacement sanitary pumps or liquid-ring vacuum pumps can also be used to deliver water at these high pressures and/or at these high flow rates. More than one such device for supplying water at the desired high flow rate and/or high pressure can be used. For example, as many as three or more such devices can be used to deliver a sufficiently high flow rate of water at a sufficient pressure to a single manifold.

Where air is the gas being expelled, an air compressor can be used to achieve the aforementioned high volumes and high pressures. If desired, a squirrel cage blower, a regenerative blower, or a liquid-ring vacuum pump can be used to deliver air at these high pressures and/or at these high volumes. More than one such device for supplying air at the desired high flow rate and/or high pressure can be used. For example, as many as three or more such devices can be required to deliver a sufficient volume of air at a sufficient pressure to a single manifold.

In its preferred embodiment, the manifold 96 is a pipe from which two or more orifices 94 extend. Referring to FIG. 2, while the manifold 96 can extend axially the length of the blancher 20, it can be broken up into two or more smaller manifolds each having a length less than the blancher 20 that are each connected to a separate fluid delivery source, system, or device. While the manifold 96 shown in FIG. 2 has a single inlet 112 and a single outlet 114, the manifold 96 can be equipped with more than one inlet where more than one fluid delivery source, system or device is connected to the manifold 96. The manifold outlet 114 can be capped, such as is shown in FIG. 1, or it can have a return, if desired. Other arrangements for connecting more than one fluid delivery source, system or device can be used.

FIG. 5 depicts a preferred embodiment of the invention having at least a plurality of spaced apart banks 116 of orifices 94 disposed around the food products 32 being processed with the banks 116 located between 3 o'clock and 9 o'clock. In this preferred embodiment, the blancher 20 has seven banks 116a, 116b, 116c, 116d, 116e, 116f, and 116g. Of course, a blancher can be equipped with more or less than seven banks. The banks 116a-116g can be generally equiangularly spaced apart, if desired, and are shown in FIG. 5 as being located at about the 3 o'clock, 4 o'clock, 5 o'clock, 6 o'clock, 7 o'clock, 8 o'clock, and 9 o'clock positions. Preferably, bank 116a is located between 3 o'clock and 4 o'clock, bank 116b is located between 4 o'clock and 5 o'clock, bank 116c is located between 5 o'clock and 6 o'clock, bank 116d is located between 5 o'clock and 7 o'clock, bank 116e is located between 6 o'clock and 7 o'clock, bank 116f is located between 7 o'clock and 8 o'clock and bank 116g is located between 8 o'clock and 9 o'clock.

Preferably, the blancher 20 is equipped with at least two banks of orifices 94 with both banks located in the exiting quadrant 118 of the tank 24 along where the drum sidewall 54 exits the heat transfer medium 33 during rotation. In the present case, since the drum 52 is depicted rotating clockwise, the exiting quadrant 118 extends from 6 o'clock to no more than about 9 o'clock or about 90° from perpendicular drum centerline 120 (extends through center of drum) in the direction of drum rotation. Where the drum 52 is rotating clockwise, the exiting quadrant extends from 6 o'clock to no more than about 3 o'clock or no more than 90° from centerline 120 in the opposite direction.

The orifices 94 in a particular bank preferably all expel the same type of fluid in flow 106. If desired, the orifices 94 in all of the banks can all expel the same type of fluid in flow 106. However, different types of fluid can be discharged from different orifices 94, if desired. For example, where the food products 32 are relatively heavy, liquid can be expelled from the orifices 94 of at least one bank and gas can be expelled from orifices 94 of at least one other bank not expelling liquid.

In one preferred arrangement, the orifices 94 of banks 116a, 116c, 116e, and 116g all expel a gas at a high volume and the orifices 94 of the remaining banks 116b, 116d and 116f all expel water at a high volume. In another preferred arrangement, orifices 94 of one or more of banks 116c, 116e, and 116d expel a gas, preferably air, while the orifices 94 of one or more of the remaining banks, 116a, 116b, 116f and 116g, expel a liquid that preferably is water.

In still another preferred arrangement, only banks in the exiting quadrant are used, e.g. between 6 o'clock and 9 o'clock in FIG. 5, with the orifices 94 of at least one of the banks ejecting air and the orifices 94 of at least one other of the banks ejecting water. For example, the orifices 94 of at least one of banks 116d and 116g eject water and the orifices 94 of at least one of banks 116e and 116f eject air. If desired, the orifices 94 of at least one of banks 116d and 116g eject air and the orifices 94 of at least one of banks 116e and 116f eject water.

Figure 6:
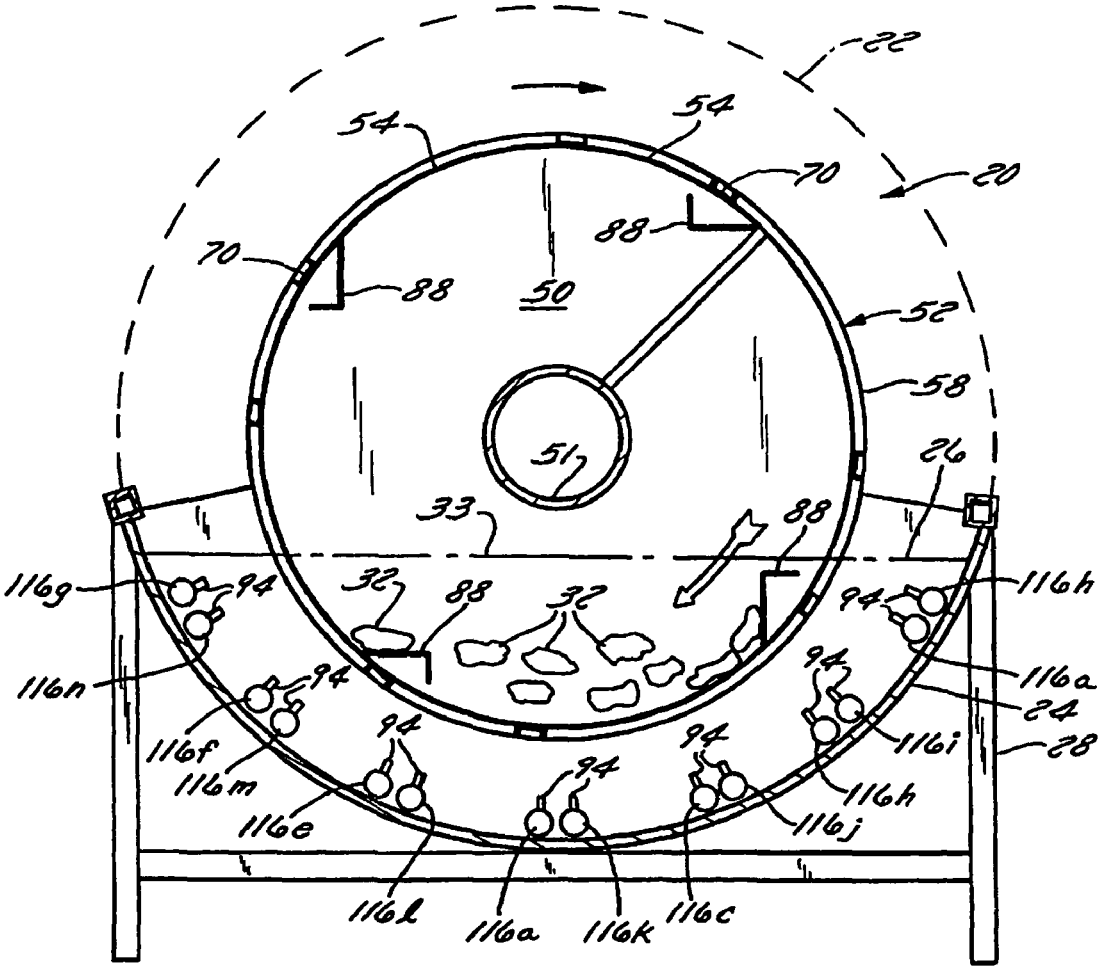
FIG. 6 is a sectional view of still another preferred blancher embodiment.

FIG. 6 illustrates a preferred embodiment having banks 116a, 116b, 116c, 116d, 116e, 116f, and 116g of orifices 94 that discharge liquid and banks 116h, 116i, 116j, 116k, 116l, 116m, and 116n of orifices 94 that discharge gas. Preferably, bank 116h is located between 3 o'clock and 4 o'clock, bank 116i is located between 4 'clock and 5 o'clock, bank 116j is located between 5 o'clock and 6 o'clock, bank 116k is located between 5 o'clock and 7 o'clock, bank 116l is located between 6 o'clock and O'clock, bank 116m is located between 7 o'clock and 8 o'clock and bank 116n is located between 8 o'clock and 9 o'clock. One or more of banks 116a-116g can be used and one or more of banks 116b-116n can be used.

Figure 7:
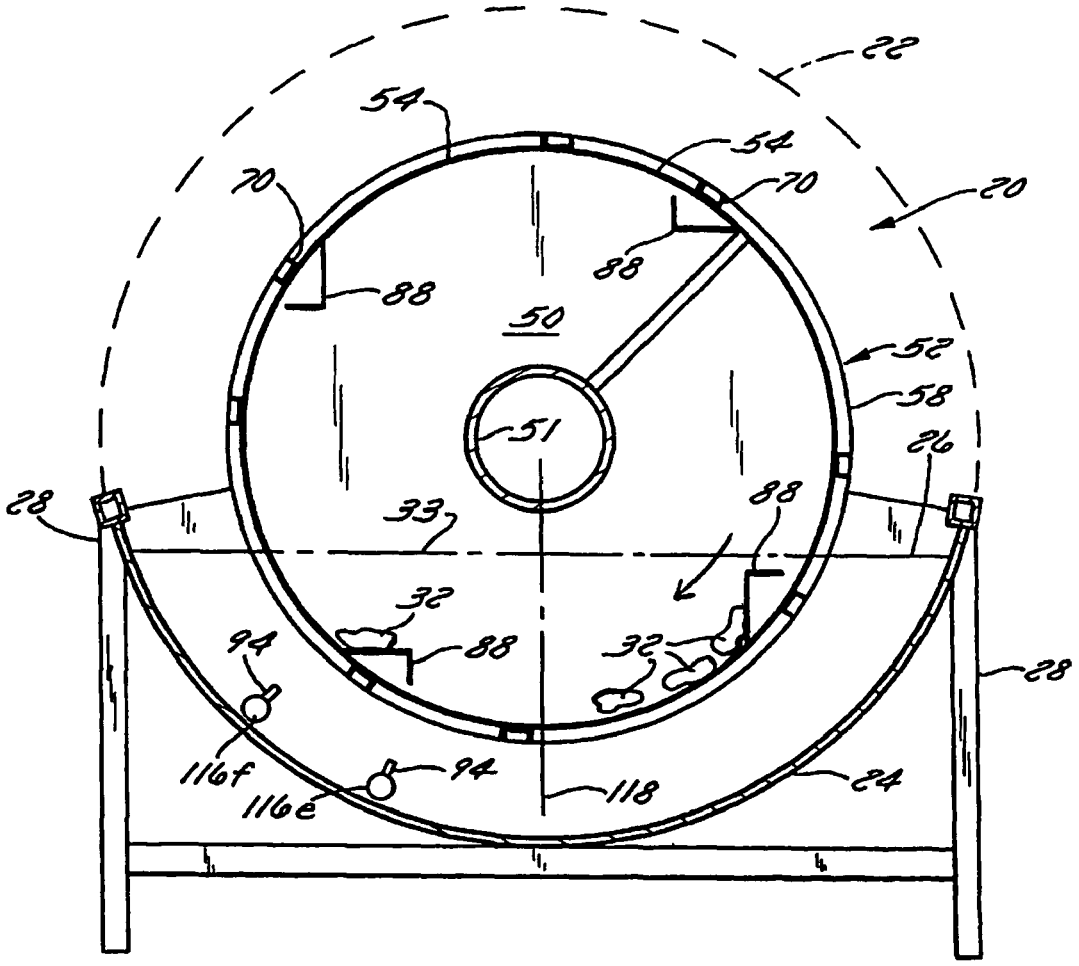
FIG. 7 is a sectional view of a further preferred blancher embodiment.

FIG. 7 illustrates one preferred arrangement for processing relatively heavy food products 32 having a density of at least 55 lb/ft$^3$. Examples of such food products include hot dogs, hot dogs in packages or pouches, turkey breasts, chicken breasts, beef patties, and steaks. Hot dogs, turkey breasts, and other meat products, for example, have a density of about 65 lb/ft$^3$ and therefore are difficult to uniformly heat, and are difficult to quickly pasteurize. The blancher 20 has at least one bank 116e of orifices 94 located between 6 o'clock and 8 o'clock (or between 4 o'clock and 6 o'clock where the drum 52 is rotating counterclockwise) from which air is injected into a liquid heat transfer medium that preferably is water heated to a temperature above 120° Fahrenheit. Preferably, bank 116e is located within 65° of centerline 120 in the direction of drum rotation. Since rotation is clockwise, bank 116e is located within 65° to the left of centerline 120. This injected air has the desired effect of making the relatively heavy food products 32 more buoyant and therefore easier to lift off the bottom of the drum 52. The air also impinges against at least some of the food products near the bottom of the drum 52 physically urging them away from the bank 116e and hence the drum sidewall 54. This also desirably agitates at least some of the food products 32 in the drum 52 and thereby also improves heat transfer.

The blancher 20 has at least one bank 116f of orifices 94 located between 7 o'clock and 9 o'clock from which water is injected into the water heat transfer medium 33. Preferably, bank 116f is located within a band that extends between 45° and 85° from centerline 120 in the direction of drum rotation. This injected water has the desired effect of forcefully churning the relatively heavy food products 32, urging them away from the bank 116f and drum sidewall 54, breaking them up, and agitating them.

Baffles 88 are also used to physically contact food products 32 and move food products 32 that are clumped together in a direction away from the drum sidewall 54. Thereafter, the combination of injected air and injected water helps urge the food products 32 toward the surface of the water 33, breaking it up, all while intensely agitating the food products 32. As a result of breaking up food products 32 that have clumped together, heat transfer is dramatically improved because the water 32 in the tank 24 can directly contact each of the food products 32.

Although use of baffles 88 is preferred, they are not needed for all applications. For those applications not requiring baffles, a combination of gas injection and liquid injection, such as in the manner discussed above, can be used.

Either high volume air at a pressure of at least 2 psi and a volume of at least 60 SCFM/ft or high-pressure air at a pressure of at least 80 psi and a volume of at least 10 SCFM/ft is discharged from the orifices 94 of bank 116e. Where the air is discharged at a pressure of less than 80 psi, at least 60 SCFM is discharged from each orifice 94 discharging air. Otherwise, at least 10 SCFM is discharged from each orifice 94 of each orifice that is discharging air. Either high volume water at a pressure of at least 30 psi and a flow rate of at least 80 gpm/ft or high-pressure water at a pressure of at least 80 psi and a flow rate of at least 20 gpm/ft is discharged from the orifices of bank 116f. Preferably, at least 20 gpm is discharged from each orifice of each bank that is discharging water. If desired, one or more orifices 94 or banks of orifices can be employed that discharge a vapor that preferably is steam.

Because these relatively heavy food products 32 are also each relatively large in size, the drum sidewall perforations 68 each are at least ⅜ inch in width or diameter. Preferably, for such large food products 32 the drum sidewall perforations 68 each can range in size (width or diameter) from ½ inch to ¾ inch.

Where the food products 32 are to be blanched and the heat transfer medium 33 in the tank 24 is water, the water 33 preferably is kept at a temperature above 185° Fahrenheit (F.). Where the food products 32 are to be pasteurized, the water 33 is kept at a temperature above 120° F. and each food product 32 resides in the blancher 20 for at least 3 minutes and as long as 720 minutes. Preferably, pasteurization of these kinds of relatively heavy food products 32 at or above this temperature takes no more than about 4 minutes per food product 32. The use of the aforementioned directed flows 106 advantageously reduces pasteurization time by as much as 25% while helping to ensure complete and uniform pasteurization of each food product.

More product can advantageously be blanched or pasteurized at one time. For example, where only a few inches of relatively heavy food product 32 can be processed in a prior art blancher at a given moment, at least double the food product depth can be processed in a blancher of this invention using a method of this invention. For example, no more than six inches depth of packaged hot dogs 32 can be blanched in a prior art 72 inch diameter blancher equipped only with baffles 88, whereas at least eight inches and preferably at least twelve inches of depth of packaged hot dogs 32 can be blanched by a blancher 20 of the present invention that is also 72 inches in diameter. This also translates into dramatically increased throughput. More specifically, where a certain amount of food products 32 can be processed in a given hour using a prior art blancher, a blancher 20 of the present invention will process at least double that amount. For example, a 72-inch diameter blancher 20 of the present invention will process at least 6000 pounds per hour (lbs/hr) of relatively heavy food product 32 as compared to no more than 3000 lbs/hr for a prior art blancher of the same size. This is true for the processing of hot dogs or packaged hot dogs. Experiments with a prior art blancher equipped with baffles resulted in only 5000 lbs/hr of food product 32 being processed, whereas at least 10000 lbs/hr of the same food product 32 can be processed using a blancher 20 of this invention. Thus, the preferred arrangement can process at least 8000 lbs/hr of food product 32.

Figure 8:
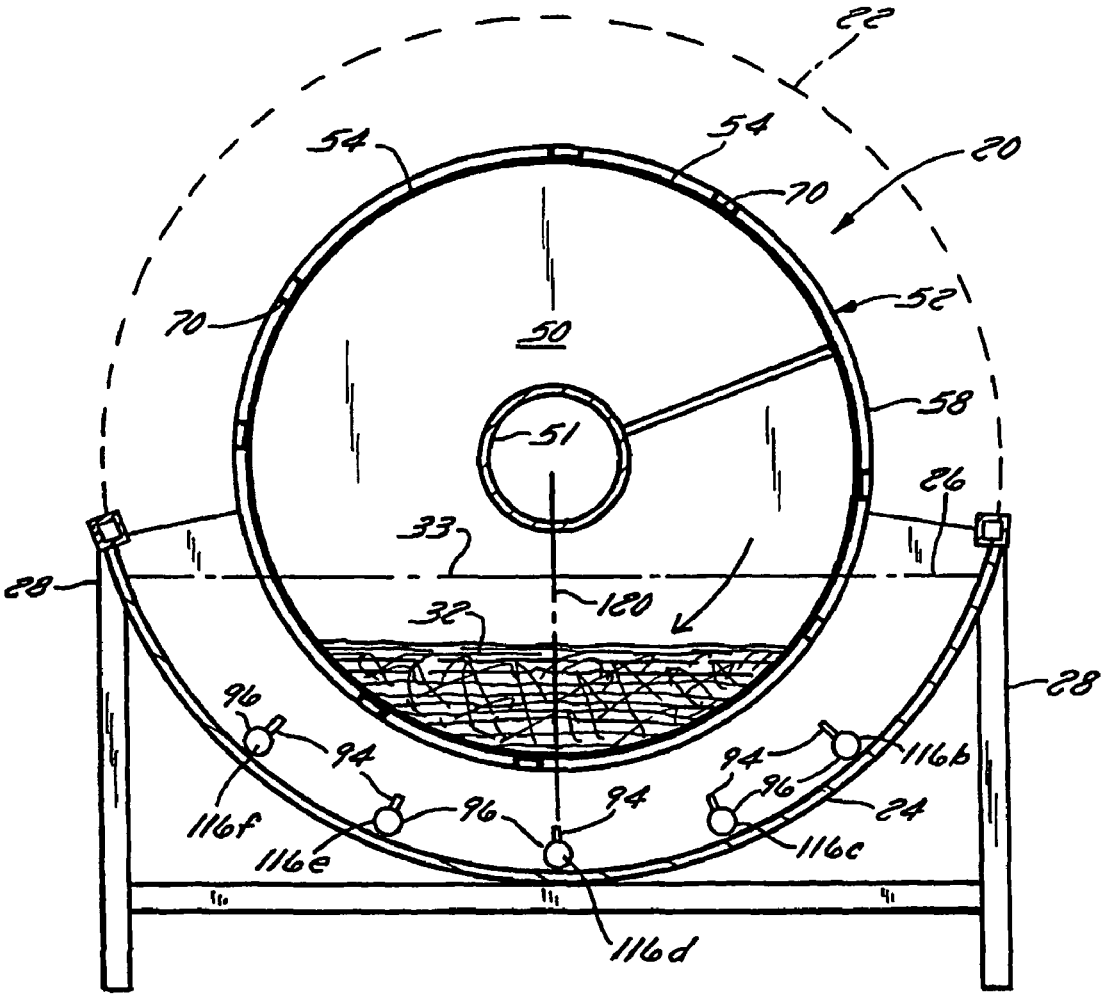
FIG. 8 is a sectional view of a still further preferred blancher embodiment.

FIG. 8 depicts another arrangement of the invention that is used to process food products having a density no greater than 55 lb/ft$^3$. This arrangement is suited for processing relatively fragile food products 32 that include, for example, pasta, lasagna, and tortellini. For exemplary purposes, pasta or lasagna food products 32 are shown in FIG. 8 and have a density of about 40 lb/ft$^3$.

The arrangement shown in FIG. 8 includes at least a plurality of pairs of spaced apart banks 116b, 116c, 116d, 116e and 116f of orifices 94 that each deliver a fluid that preferably is a gas, namely air. Bank 116b is disposed between 3 o'clock and 5 o'clock or lies within a band located between 45° and 65° from the perpendicular drum centerline 120 in a direction opposite the direction of drum rotation (measured from the center of the drum and line 120). Bank 116c is disposed between 4 o'clock and 6 o'clock or lies within a band located between 25° and 40° from the centerline 120 in a direction opposite the direction of drum rotation. Bank 116d is disposed between 5 o'clock and 7 o'clock or lies within ±25° of the centerline 120. Bank 116e is disposed between 6 o'clock and 8 o'clock or lies within a band located between 25° and 40° from the centerline 120 in a direction the same as the direction of drum rotation. Bank 116f is disposed between 7 o'clock and 9 o'clock or lies within a band located between 45° and 65° from the centerline 120 in a direction the same as the direction of drum rotation.

Air is discharged from the orifices 94 in each bank 116b-116f either generally upwardly or generally toward the food products 32 in the drum 52 causing at least some of the air to become trapped in the food products 32 thereby increasing their buoyancy. By increasing the buoyancy of the food products 32 in the drum 52, at least some of the food products 32 begin to float and rise from the bottom of the drum 52 (where the food products 32 are shown in FIG. 8), and thereby become more directly exposed to the water heat transfer medium 33. The discharged air also advantageously has the desired effect of churning the water 33 and also agitating the food products 32. As a result of the high volumes and/or high pressures used, the agitation achieved is more vigorous and more forceful. All of this advantageously increases heat transfer to the food products 32 without requiring direct contact between food products 32 and mechanical agitation devices such as baffles. Thus, no baffles are needed and no baffles are shown in FIG. 8 making this arrangement particularly suitable for processing relatively fragile food products.

Either high volume air at a pressure of at least 2 psi and a volume of at least 60 SCFM/ft or high pressure air at a pressure of at least 80 psi and a volume of at least 10 SCFM/ft is discharged from the orifices 94 of each bank of one or more of banks 116b-116f. Preferably, at least 10 SCFM is discharged from each orifice 94 of each bank that is discharging air. Where pasta or pasta-based products 32 are processed, the drum sidewall perforations 68 each are no greater than 5/32 inch in width or diameter. During processing of these kinds of products, the water preferably is kept at a temperature of above 190° F. and can be cooked in the manner previously described, if needed.

If desired, one or more orifices 94 or banks of orifices 94 can be employed through which water is discharged. If desired, one or more orifices 94 or banks of orifices 94 can be employed through which steam is discharged.

More product can advantageously be blanched, cooked, or pasteurized at one time. For example, where only a few inches of relatively fragile pasta or lasagna 32 can be processed in a prior art blancher at a given moment, at least double the food product depth can be processed in a blancher of this invention. For example, where no more than six inches depth of pasta or lasagna can be blanched in a prior art 72 inch diameter blancher, at least eight inches and preferably at least twelve inches of depth of pasta or lasagna 32 can be blanched by a 72 inch diameter blancher 20 of the present invention. This also translates into dramatically increased throughput. More specifically, where a certain amount of food products 32 can be processed in a given hour using a prior art blancher, a blancher 20 of the present invention will process at least double that amount. For example, a 72-inch diameter blancher 20 of the present invention will process at least 4500 lbs/hr and preferably at least 7000 lbs/hr of pasta or lasagna 32 as compared to a prior art 72-inch diameter blancher, which can only process 3500 lbs/hr.

Figure 9:
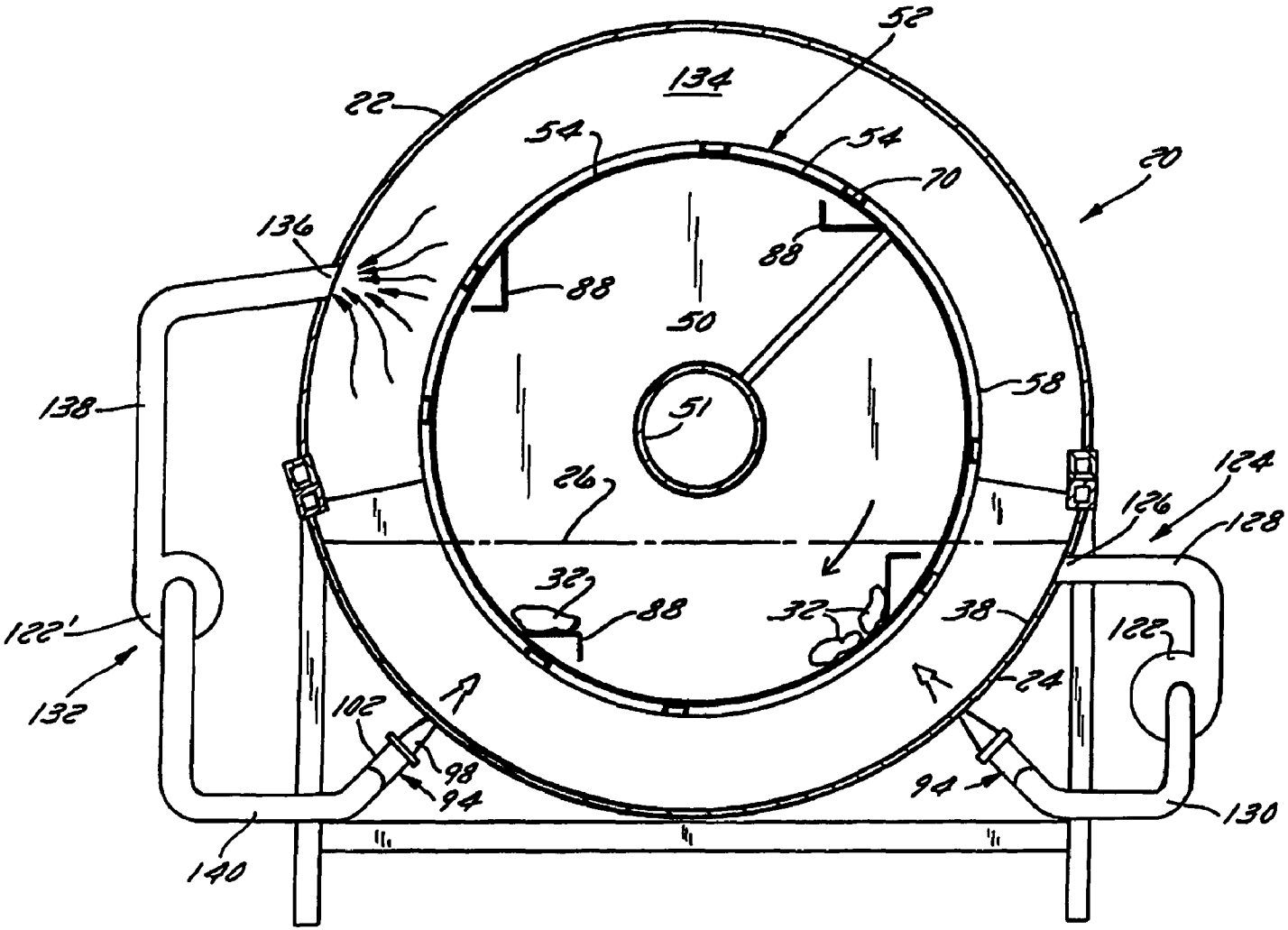
FIG. 9 is a sectional view of a blancher with a schematic depiction of recirculation systems for recirculating fluid from the blancher.

FIG. 9 depicts a blancher 20 of this invention having at least one orifice 94 from which a fluid is discharged into the tank 24. The discharged fluid is drawn from within the blancher 20 by a pump 122 that delivers the fluid to the orifice 94. Such an arrangement advantageously conserves energy because it recirculates the fluid discharged into the blancher 20 lessening heat losses.

FIG. 9 illustrates a first fluid recirculation system 124 where a liquid heat transfer medium 26 is disposed in the tank 24. The system includes an inlet 126 through which liquid from the blancher 20 enters a conduit 128. The liquid flows through the conduit 128 to a pump 122 that delivers the liquid via another conduit 130 to orifice 94. The liquid is discharged through the orifice 94 into the tank 24. In one embodiment, the orifice 94 is disposed so as to direct the liquid toward a particular location, such as the drum 52, one or more food products 32 in the drum 52, or a spot or region where food products 32 tend to congregate or clump. In the arrangement shown in FIG. 9, the inlet 126 is disposed below the water line of the liquid heat transfer medium 26 and above orifice 94. If desired, the drum 52 can be equipped with one or more baffles 88.

FIG. 9 further illustrates a second fluid recirculation system 132 where atmosphere 134 within the blancher 20 is collected and discharged into the tank 24. The atmosphere within the blancher typically comprises gas and vapor, typically air and water vapor, but can be comprised solely of a gas or a vapor. Where a liquid heat transfer medium 26 is used, the atmosphere 134 is disposed above the liquid 26. The system includes an inlet 136 through which atmosphere 134 in the blancher 20 is drawn into a first conduit 138. The atmosphere 134 flows through the conduit 138 to a pump 122' that delivers the atmosphere via a second conduit 140 to the other orifice 94. The atmosphere 134 is then discharged through that orifice 94 into the tank.

In this manner, fluid used to move and agitate food products 32 in the blancher 20 is delivered to a single orifice 94, a plurality of orifices 94, a manifold 96 connected to a plurality of orifices 94, or a plurality of manifolds 94. One or more first and second fluid recirculation systems 124 and 132 can be used alone or in combination in a single blancher. The pump 122 preferably is a pump,a blower or a compressor capable of operating where moisture or liquid is present.

An example of a preferred pump for recirculating atmosphere is a liquid-ring vacuum pump or liquid-ring vacuum compressor. Examples of liquid-ring vacuum pumps or compressors are disclosed in U.S. Pat. Nos. 4,787,824 and 5,580,222, the disclosures of which are expressly incorporated herein. A liquid-ring vacuum pump or liquid-ring vacuum compressor is particularly preferred for pump 122' because of its ability to suck hot air carrying water vapor from inside the blancher 20 and deliver it under pressure to an orifice 94, a plurality of orifices 94, and/or one or more manifolds. This type of pump is also preferred because of its ability to be able to reliably pump air containing moisture for long periods of time and over a long service life all while withstanding a rather harsh operating environment.

Figure 10:
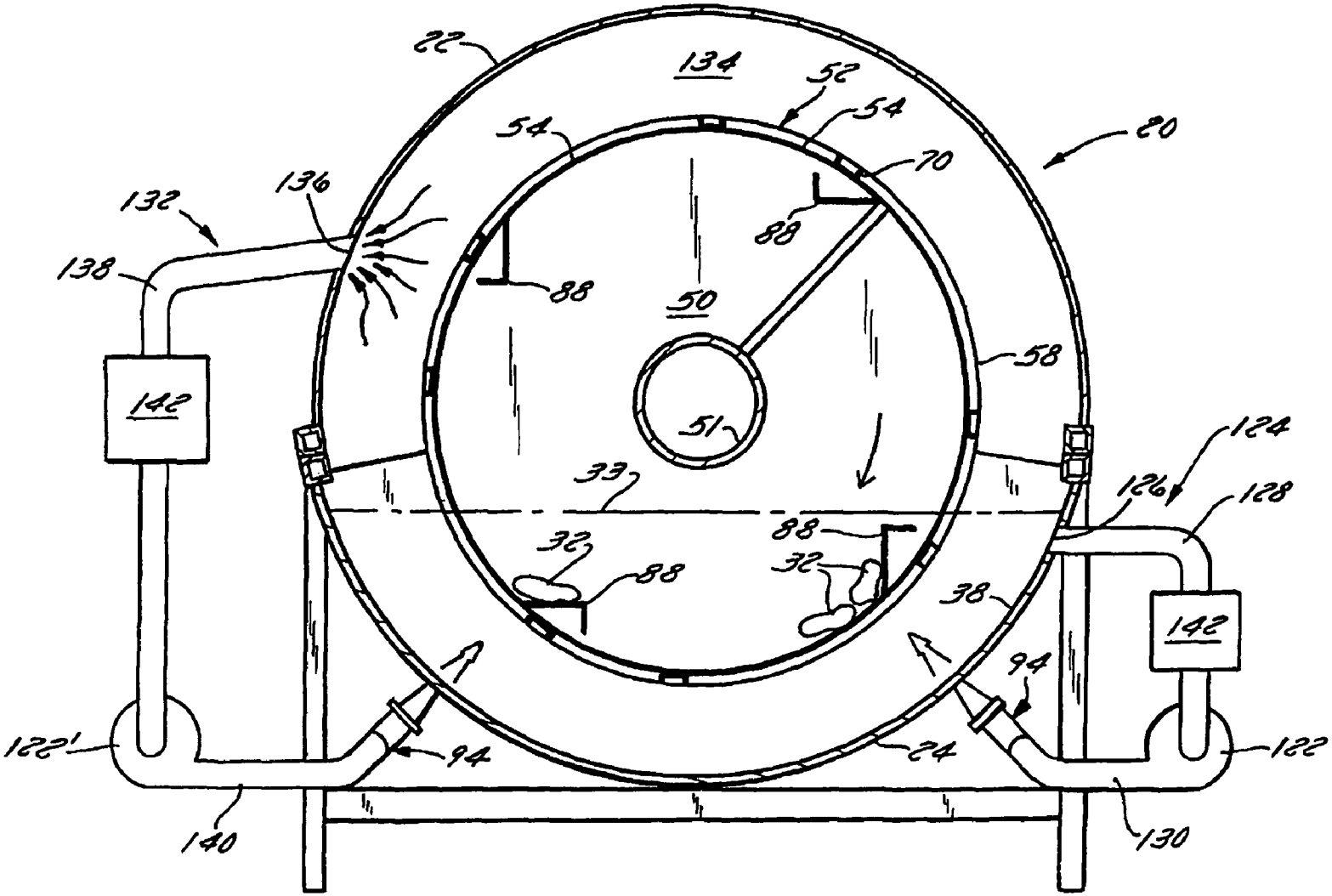
FIG. 10 is a sectional view of a blancher with a schematic depiction of recirculation systems for heating and recirculating fluid from the blancher.

FIG. 10 illustrates first and second recirculation systems 124 and 132 each with a heater 142 that heats the fluid being recirculated. For example, the first recirculation system 124 includes a heater 142 that can be located upstream of the pump 122 to heat the liquid drawn from the blancher 20. The second recirculation system 124 can also include a heater 142 that heats the atmosphere 134 drawn from within the blancher 20. Examples of suitable fluid heaters 142 include gas fluid heaters and electric fluid heaters. Heated liquid, heated atmosphere, or heated vapor can be added to the fluid being recirculated. If desired, the heater 142 can be located downstream of the pump 122 or pump 122'.

These recirculation systems advantageously conserve energy by recirculating already hot fluid from the blancher 20 thereby preventing the heat loss that would occur if cooler ambient air outside the blancher 20 or cooler plant water was instead used. If, desired, the first fluid recirculation system 124 and/or the second fluid recirculation system 132 shown in FIGS. 9 and 10 can be used with any one of the arrangements depicted in FIGS. 1-8 and can be used to recirculate liquid at flow rates and pressures less than those discussed above in association with the arrangements depicted in FIGS. 1-8.

In use, the blancher 20 of this invention is used to process food products 32 preferably by blanching or pasteurizing the food products 32. Food product 32 that can be processed using the blancher 20 includes food product 32 in pouches that are preferably constructed of a flexible, synthetic material that typically is of laminate construction. Examples of such pouched food product include: sauces, soups, juices, catsup, fruits, certain pastas, vegetables, meats, hot dogs, and the like. Food products 32 that can be processed using the blancher 20 include food products 32 not in pouches. For example, and without limitation, pastas and vegetables like potatoes, corn, rice, beans, spinach, are but a few types of food products 32 not in pouches that can be heated, cooked or blanched by the blancher 20 of this invention.

In operation, food products 32 are introduced into the blancher 20 through the inlet 60 and preferably enter the drum 52. The food product transport mechanism 44 urges the food products 32 received in the blancher 20 toward the outlet 62 preferably by rotation.

Where the food product transport mechanism 44 is an auger 48, the rate of rotation of the auger 48 is controlled to control the residency time of the food products 32 within the blancher 20. For example, the auger 48 can be rotated as slow as one-half of a revolution per minute to as fast as ten or more revolutions per minute depending on factors such as 1) the type of food product 32, 2) the length of the blancher 20, 3) the diameter of the blancher 20, 4) whether the food product 32 is simply being blanched or pasteurized, 5) the type of heat transfer medium 33 being used, and 6) other factors. Typically, selection of a rate of rotation is based upon experience and routine testing and experimentation.

As the food products 32 travel along the blancher 20, they are immersed in the heat transfer medium 33, which heats the food products 32. Where the blancher 20 is equipped with baffles 88, the baffles 88 help scoop up at least some of the food products 32 that have fallen to the bottom. As each baffle 88 rises toward the surface of the heat transfer medium 33, typically water, food products 32 carried by the baffle 88 slide off and tumble, thereby agitating the food products 32 while also helping to break up clumps of food products 32.

Where liquid injection is used, the liquid flows 106 are directed from orifices 94 toward food products 32 in the blancher 20 displacing at least some of the food products 32 which helps break up any food products 32 that have clumped together, increasing heat transfer efficiency. Additionally, the liquid flows 106 directed toward the food products 32 help agitate them thereby increasing heat transfer efficiency. Where liquid, such as water, is discharged, the volumetric flow rate and pressure are selected to satisfy the following condition:

$$P * V \geq 55 \frac{\text{lbs} * \text{gallons}}{\text{in}^2 * \text{min}} \qquad \text{(Equation I)}$$

where:

P is the pressure of the liquid in psi; and

V is the volumetric flow rate of liquid discharged from each orifice 94 in gpm.

Where more turbulence is desired, the volumetric flow rate and pressure are selected to provide highly turbulent flow within the blancher and satisfy the following condition:

$$P * V \geq 65 \frac{\text{lbs} * \text{gallons}}{\text{in}^2 * \text{min}} \qquad \text{(Equation II)}$$

Where gas injection is used, the gas flows 106 are directed from orifices 94 toward food products 32 in the blancher 20 increasing the buoyancy of at least some of the food products 32. By increasing buoyancy, at least some of the food products 32 will float up from the bottom and thereby become more directly exposed to the heat transfer medium 33 increasing heat transfer efficiency. Depending upon the volume and pressure of gas injected, the force of the gas flows 106 impinging against food products 32 will also help agitate them which further increases heat transfer efficiency. Depending upon the force with which the gas impinges, the gas flows 106 impinging against food products 32 can also help break up clumps of food products. Where a gas, such as air, is discharged, the flow rate and pressure are selected to provide highly turbulent flow within the blancher and to satisfy the following condition:

$$P * V \geq 0.1275 \frac{\text{in of } H_2O}{\text{CFM}} \qquad \text{(Equation III)}$$

where:

P is the pressure of the gas in inches of $H_2O$; and

V is the volumetric flow rate of gas discharged from each orifice 94 in CFM.

Where even more flow and turbulence are desired, the gas flow rate and pressure are selected to satisfy the following condition:

$$P * V \geq 0.15 \frac{\text{in of } H_2O}{\text{CFM}} \qquad \text{(Equation IV)}$$

Where steam is discharged, the flow rate and pressure are selected to provide highly turbulent flow within the blancher and satisfy the following condition:

$$P * V \geq 300 \frac{\text{lbs}^2}{\text{in}^2 * \text{hr}} \qquad \text{(Equation V)}$$

where:

P is the pressure of the steam in pounds per square inch; and

V is the volumetric flow rate of steam discharged from each orifice 94 in lbs/hr.

In some instances, it may be desirable to use gas injection alone to increase heat transfer. In other instances, it may be desirable to use gas injection in combination with baffles 88 or another direct-contact agitation device. In still other instances, it may be desirable to use a combination of gas injection and liquid injection or a combination of gas injection, liquid injection, and direct-contact agitation devices. In even other instances, it may be desirable to use liquid injection with or without direct-contact mechanical agitation devices.

Once food products 32 have completed their journey through the blancher 20, they are discharged from the outlet 62. After that, the food products 32 can be packaged and shipped, packaged and frozen, stored, or further processed.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A blancher for heating a plurality of food products at the same time comprising:

[a)] a *perforate* food product-receiving chamber that has a food product inlet, a food product outlet, a *liquid* heat transfer medium, and a plurality of food products received therein;

[b)] a food product transport mechanism received in the food product-receiving chamber [for urging] *that rotates thereby urging* food products in the food product-receiving chamber *in a lengthwise direction* from adjacent the food product inlet toward the food product outlet; [and c) an orifice] *a manifold comprised of a plurality of pairs of spaced apart orifices* disposed in fluid flow communication with the heat transfer medium from which [a fluid] *liquid heat transfer medium* under pressure is discharged into the food product-receiving chamber *at a flow rate of at least twenty gallons per minute per foot of length of the manifold;*

*wherein the manifold is oriented in a lengthwise direction and disposed outwardly of the food product-receiving chamber with its orifices directing flow of liquid heat transfer medium toward the food product-receiving chamber and located outwardly of a lengthwise-extending centerline of the blancher in an exiting quadrant thereof defined from where the rotating food product-receiving chamber emerges from the heat transfer medium to adjacent the centerline but not passing to or beyond the centerline.*

2. The blancher of claim 1 wherein:

[1)] the food product transport mechanism comprises an auger having a plurality of pairs of axially spaced auger flights that each has a direct-contact mechanical agitation device for agitating food products by direct contact;

[2) there is a plurality of pairs of the orifices disposed in fluid flow communication with the heat transfer medium each for discharging a fluid under pressure toward the food products;

3) the heat transfer medium is comprised of a liquid; and]

[4)] the [fluid is a liquid] *liquid heat transfer medium is* discharged from each of the orifices at a volumetric flow rate of at least 20 gpm for increasing heat transfer to the food products.

3. The blancher of claim 2 wherein the direct-contact mechanical agitation device comprises a baffle extending from the auger.

4. The blancher of claim 2 further comprising a tank that receives the heat transfer medium wherein the tank has an inlet through which the heat transfer medium is introduced.

5. The blancher of claim 4 wherein the tank further comprises an outlet through which the heat transfer medium is drained to empty the tank of the heat transfer medium.

6. The blancher of claim 2 wherein the blancher has at least as many orifices as there are auger flights and wherein there is an orifice disposed adjacent each one of the auger flights.

7. The blancher of claim 2 wherein there is an orifice between each adjacent pair of auger flights of the plurality of pairs of auger flights.

8. The blancher of claim 2 wherein there are two orifices between each adjacent pair of auger flights of the plurality of pairs of auger flights.

9. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* the food product transport mechanism comprises an auger having a plurality of pairs of axially spaced auger flights that each has a direct-contact mechanical agitation device for agitating food products by direct contact;

[2)] *wherein* there is a plurality of pairs of the orifices disposed in fluid flow communication with the heat transfer medium each for discharging a fluid under pressure toward the food products;

[3)] *wherein* the heat transfer medium comprises a liquid; and

[4)] *wherein* the fluid is a gas discharged from each of the orifices at a volumetric flow rate of at least 60 CFM for increasing heat transfer to the food products.

10. The blancher of claim 9 wherein the direct-contact mechanical agitation device comprises a baffle extending from the auger.

[11. The blancher of claim 9 further comprising a tank that receives the heat transfer medium wherein the tank has an inlet through which the heat transfer medium is introduced.]

12. The blancher of claim [11] *9* wherein the tank further comprises an outlet through which the heat transfer medium is drained to empty the tank of the heat transfer medium.

13. The blancher of claim 9 wherein the blancher has at least as many orifices as there are auger flights and wherein there is an orifice disposed adjacent each one of the auger flights.

14. The blancher of claim 9 wherein there is an orifice between each adjacent pair of the plurality of pairs of auger flights.

15. The blancher of claim 9 wherein there are two orifices between each adjacent pair of auger flights of the plurality of pairs of auger flights.

16. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* there is a first plurality of the orifices in fluid flow communication with the heat transfer medium, each of the orifices of the first plurality of orifices discharging a liquid under pressure into the heat transfer medium;

[2)] *wherein* there is a second plurality of the orifices in fluid flow communication with the heat transfer medium, each of the orifices of the second plurality of orifices discharging a gas under pressure into the heat transfer medium; and

[3)] *wherein* the heat transfer medium comprises a liquid.

17. The blancher of claim 16 wherein the liquid discharged from each of the orifices of the first plurality of orifices is water.

18. The blancher of claim 16 wherein the gas discharged from each of the orifices of the second plurality of orifices is air.

19. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* there is a first plurality of the orifices in fluid flow communication with the heat transfer medium, each of the orifices of the first plurality of orifices discharging a liquid under pressure into the heat transfer medium;

[2)] *wherein* there is a second plurality of the orifices in fluid flow communication with the heat transfer medium, each of the orifices of the second plurality of orifices discharging a gas under pressure into the heat transfer medium;

[3)] *wherein* the heat transfer medium comprises a liquid;

[4)] *wherein* the liquid discharged from each of the orifices of the first plurality of orifices is discharged at a volumetric flow rate of at least 20 gpm; and

[5)] *wherein* the gas discharged from each of the orifices of the [first] *second* plurality of orifices is discharged at a volumetric flow rate of at least 60 CFM.

20. The blancher of claim 19 further comprising a first manifold connected to the first plurality of orifices and a second manifold connected to the second plurality of orifices.

[21. The blancher of claim 1 wherein the heat transfer medium comprises a liquid, the food product transport mechanism comprises an auger that rotates during operation, the auger having a plurality of pairs of spaced apart auger flights with one side of each of the auger flights entering the liquid heat transfer medium along one side of the blancher and another side of each of the auger flights exiting the liquid heat transfer medium along the other side of the blancher, and there are a plurality of pairs of orifices arranged in a bank that is disposed in the liquid heat transfer medium along the other side of the blancher.]

[22. The blancher of claim 21 wherein at least some of the food products tend to gather in a clump along the other side of the blancher and the orifices direct the fluid discharged therefrom toward the clump of food products.]

23. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* the food product transport mechanism comprises an auger having a plurality of pairs of axially spaced auger flights that each has a direct-contact mechanical agitation device for agitating food products by direct contact;

[2)] *wherein* there is a plurality of pairs of the orifices disposed in fluid flow communication with the heat transfer medium each for discharging a fluid under pressure toward the food products;

[3)] *wherein* the heat transfer medium is comprised of a liquid; and

[4)] *wherein* the liquid is discharged from each of the orifices at a pressure of at least 30 psi for increasing heat transfer to the food products.

24. [The blancher of claim 21 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

*wherein the heat transfer medium comprises a liquid, the food product transport mechanism comprises an auger that rotates during operation, the auger having a plurality of pairs of spaced apart auger flights with one side of each of the auger flights entering the liquid heat transfer medium along one side of the blancher and another side of each of the auger flights exiting the liquid heat transfer medium along the other side of the blancher, and there are a plurality of pairs of orifices arranged in a bank that is disposed in the liquid heat transfer medium along the other side of the blancher;*

[1)] *wherein* the food product transport mechanism comprises an auger having a plurality of pairs of axially spaced auger flights that each has a direct-contact mechanical agitation device for agitating food products by direct contact;

[2)] *wherein* there is a plurality of pairs of the orifices disposed in fluid flow communication with the heat transfer medium each for discharging a fluid under pressure toward the food products;

[3)] *wherein* the heat transfer medium is comprised of a liquid; and

[4)] *wherein* the fluid discharged from each of the orifices is a liquid at a pressure of at least 80 psi.

25. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* the food product transport mechanism comprises an auger having a plurality of pairs of axially spaced auger flights that each has a direct-contact mechanical agitation device for agitating food products by direct contact;

[2)] *wherein* there is a plurality of pairs of the orifices disposed in fluid flow communication with the heat transfer medium each for discharging a fluid under pressure toward the food products;

[3)] *wherein* the heat transfer medium comprises a liquid; and

[4)] *wherein* the fluid discharged from each of the orifices is a gas at a pressure of at least 2 psi and at a flow rate of at least 100 CFM.

26. [The blancher of claim 1 wherein] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet; and*

*an orifice disposed in fluid flow communication with the heat transfer medium from which a fluid under pressure is discharged into the food product-receiving chamber;*

[1)] *wherein* there is a first plurality of the orifices in fluid flow communication with the heat transfer medium, each of the orifices of the first plurality of orifices discharging a liquid under pressure into the heat transfer medium;

[2)] *wherein* there is a second plurality of the orifices in fluid flow communication with the heat transfer medium, each of the orifices of the second plurality of orifices discharging a gas under pressure into the heat transfer medium;

[3)] *wherein* the heat transfer medium comprises a liquid;

[4)] *wherein* the liquid discharged from each of the orifices of the first plurality of orifices is discharged at a pressure of at least 30 psi; and

[5)] *wherein* the gas discharged from each of the orifices of the [first] *second* plurality of orifices is discharged at a pressure of at least 2 psi.

27. [The blancher of claim 1 further comprising] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet;*

*an orifice disposed in fluid flow communication with the heat transfer medium from which a fluid under pressure is discharged into the food product-receiving chamber;*

[1)] a tank; *and*

[2)] a perforate drum disposed in the tank and which comprises the food product-receiving chamber;

[3)] *wherein the orifice includes* a first bank of the orifices each in fluid flow communication with the tank and pointed toward the perforate drum wherein the first bank of the orifices extends in an axial direction relative to the tank and has at least two of the orifices[;],

[4)] a second bank of the orifices each in fluid flow communication with the tank and pointed toward the perforate drum wherein the second bank of the orifices extends in an axial direction relative to the tank and has at least two of the orifices[;], and

[5)] a third bank of the orifices each in fluid flow communication with the tank and pointed toward the perforate drum wherein the third bank of the orifices extends in an axial direction relative to the tank and has at least two of the orifices.

28. The blancher of claim 27 wherein each of the banks of the orifices is disposed between the tank and the perforate drum.

29. The blancher of claim 27 wherein the fluid discharged from each of the orifices passes through the perforate drum.

30. The blancher of claim 29 wherein the fluid discharged from each of the orifices impinges against at least one of the food products in the perforate drum.

31. [The blancher of claim 1 further comprising] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet;*

*an orifice disposed in fluid flow communication with the heat transfer medium from which a fluid under pressure is discharged into the food product-receiving chamber;*

[1)] a tank; *and*

[2)] a perforate drum disposed in the tank into which are disposed the food products, wherein the food product transport mechanism is disposed in the perforate drum and rotates in a clockwise direction during operation;

[3)] *wherein the orifice includes* a first bank of the orifices with each of the orifices in fluid flow communication with the tank, wherein i) the first bank of the orifices generally extends in an axial direction relative to the tank and has at least two of the orifices, ii) the first bank of the orifices is disposed between a 6 o'clock position and an 8 o'clock position; and iii) a gas is discharged through each of the orifices of the first bank of the orifices[;], *and*

[4)] a second bank of the orifices with each of the orifices in fluid flow communication with the tank, wherein i) the second bank of the orifices generally extends in an axial direction relative to the tank and has at least two of the orifices, ii) the second bank of the orifices is disposed between a 7 o'clock position and a 9 o'clock position; and iii) a liquid *heat transfer medium* is discharged through each of the orifices of the [first] *second* bank of the orifices; and

[5)] wherein the plurality of food products has a density of greater than 55 lbs/ft$^3$.

32. [The blancher of claim 1 further comprising] *A blancher for heating a plurality of food products at the same time comprising*:

*a food product-receiving chamber that has a food product inlet, a food product outlet, a heat transfer medium, and a plurality of food products received therein;*

*a food product transport mechanism received in the food product-receiving chamber for urging food products in the food product-receiving chamber from adjacent the food product inlet toward the food product outlet;*

*an orifice disposed in fluid flow communication with the heat transfer medium from which a fluid under pressure is discharged into the food product-receiving chamber;*

[1)] a tank; *and*

[2)] a perforate drum disposed in the tank into which are disposed the food products, wherein the food product transport mechanism is disposed in the perforate drum and rotates in a clockwise direction during operation;

[3)] *wherein the orifice includes* a first bank of the orifices with each of the orifices in fluid flow communication with the tank, wherein i) the first bank of the orifices generally extends in an axial direction relative to the tank and has at least two of the orifices, ii) the first bank of the orifices is disposed within about 65° of a centerline that extends perpendicular to horizontal and extends through the center of the perforate drum; and iii) a gas is discharged through each of the orifices of the first bank of the orifices[;], *and*

[4)] a second bank of the orifices with each of the orifices in fluid flow communication with the tank, wherein i) the second bank of the orifices generally extends in an axial direction relative to the tank and has at least two of the orifices, ii) the second bank of the orifices is disposed within a band that extends between 45° and 85° of the centerline; and iii) a liquid *heat transfer medium* is discharged through each of the orifices of the [first] *second* bank of the orifices; and wherein the plurality of food products has a density of greater than 55 pounds per cubic foot.

33. The blancher of claim 32 wherein each of the food products is comprised of meat, the *liquid* heat transfer medium is water at a temperature of at least 120° Fahrenheit, and the food product transfer mechanism is rotated such that each food product resides in the blancher for at least 3 minutes such that at least one of the food products is pasteurized.

34. The blancher of claim 33 wherein the food product transport mechanism comprises a helical auger having a plurality of pairs of axially spaced apart auger flights that have at least one baffle disposed between each adjacent pair of the auger flights.

[35. The blancher of claim 1 wherein the heat transfer medium comprises a liquid, and further comprising a first conduit in fluid flow communication with the blancher, a second conduit in fluid flow communication with the orifice, and a pump in fluid flow communication with the first conduit and the second conduit that withdraws the liquid heat transfer medium and discharges the liquid heat transfer medium out the orifice.]

36. The blancher of claim 1 further comprising an atmosphere in the blancher, a first conduit in fluid flow communication with the blancher, a second conduit in fluid flow communication with the orifice, and a pump in fluid flow communication with the first conduit and the second conduit that withdraws the atmosphere and discharges the atmosphere out the orifice.

*37. A blancher for heating a plurality of food products at the same time comprising:*

*a perforate food product-receiving chamber that has a food product inlet, a food product outlet, a heat transfer medium, and a plurality of food products received therein;*

*a food product transport mechanism received in the food product-receiving chamber that rotates and urges food product in the food product-receiving chamber along the food product-receiving chamber from adjacent the food product inlet toward the food product outlet;*

*an orifice disposed in fluid flow communication with the heat transfer medium from which a fluid under pressure is discharged into the food product-receiving chamber;*

*a tank that holds the liquid heat transfer medium and which receives the food product-receiving chamber;*

*a removable cover overlying the tank;*

*a manifold comprised of a plurality of pairs of spaced apart orifices from which heat transfer medium under pressure is discharged into the food product-receiving chamber at a flow rate of at least 20 gallons per minute per foot of length of the manifold*

*wherein the manifold is 1) oriented in a lengthwise direction relative to the food product-receiving chamber with its orifices directing flow of liquid heat transfer medium toward the food product-receiving chamber and 2) located outwardly of a lengthwise-extending centerline of the blancher in an exiting quadrant thereof defined from where the rotating food product transport mechanism emerges from the liquid heat transfer medium to adjacent the centerline but not passing to or beyond the centerline.*

*38. A blancher for heating a plurality of food products at the same time comprising:*

*a perforate food product-receiving chamber that has a food product inlet, a food product outlet, a heat transfer medium, and a plurality of food products received therein;*

*a food product transport mechanism received in the food product-receiving chamber that rotates and urges food product in the food product-receiving chamber along the food product-receiving chamber from adjacent the food product inlet toward the food product outlet;*

*an orifice disposed in fluid flow communication with the heat transfer medium from which a fluid under pressure is discharged into the food product-receiving chamber;*

*a tank that holds the liquid heat transfer medium and which receives the food product-receiving chamber;*

*a removable cover overlying the tank;*

*a manifold comprised of a plurality of pairs of spaced apart orifices from which a gas is discharged into the food product-receiving chamber at a pressure of 2 pounds per square inch;*

*wherein the manifold is 1) oriented in a lengthwise direction relative to the food product-receiving chamber with its orifices directing flow of gas toward the food product-receiving chamber and 2) located outwardly of a lengthwise-extending centerline of the blancher in an exiting quadrant thereof defined from where the rotating food product transport mechanism emerges from the liquid heat transfer medium to adjacent the centerline but not passing to or beyond the centerline.*

*39. A blancher for heating a plurality of food products at the same time comprising:*

*a perforate food product-receiving chamber that has a food product inlet, a food product outlet, a heat transfer medium, and a plurality of food products received therein;*

*a food product transport mechanism received in the food product-receiving chamber that rotates and urges food product in the food product-receiving chamber along the food product-receiving chamber from adjacent the food product inlet toward the food product outlet;*

*an orifice disposed in fluid flow communication with the heat transfer medium from which a fluid under pressure is discharged into the food product-receiving chamber;*

*a tank that holds the liquid heat transfer medium and which receives the food product-receiving chamber;*

*a removable cover overlying the tank;*

*a manifold comprised of a plurality of pairs of spaced apart orifices from which vapor is discharged into the food product-receiving chamber at a rate of 20 pounds per hour and a pressure of 15 pounds per square inch;*

*wherein the manifold is 1) oriented in a lengthwise direction relative to the food product-receiving chamber with its orifices directing flow of vapor toward the food prod-*

*uct-receiving chamber and 2) located outwardly of a lengthwise-extending centerline of the blancher in an exiting quadrant thereof defined from where the rotating food product transport mechanism emerges from the liquid heat transfer medium to adjacent the centerline but not passing to or beyond the centerline.*

*40. A blancher for heating a plurality of food products at the same time comprising:*

*a tank;*

*a food product-receiving chamber that has a food product inlet, a food product outlet, a heat transfer medium, and a plurality of food products received therein, the food product-receiving chamber comprising a perforate drum disposed in the tank into which are disposed food products;*

*a food product transport mechanism received in the food product-receiving chamber for urging food products in the food product-receiving chamber from adjacent the food product inlet toward the food product outlet, the food product transport mechanism comprising an auger having a plurality of pairs of axially spaced auger flights, wherein the food product transport mechanism is disposed in the perforate drum and rotates in a clockwise direction during operation thereby urging food product from adjacent a food product inlet toward a food product outlet; and*

*an orifice disposed in fluid flow communication with the heat transfer medium from which a fluid under pressure is discharged into the food product-receiving chamber, wherein the orifice includes*

*a first bank of orifices with each of the orifices in fluid flow communication with the tank wherein i) the first bank of the orifices generally extends in an axial direction relative to the tank and has at least two of the orifices, ii) the first bank of the orifices is disposed between a 6 o'clock position and an 8 o'clock position; and iii) a gas is discharged through each of the orifices of the first bank of the orifices, and*

*a second bank of orifices with each of the orifices is in fluid flow communication with the tank, wherein i) the second bank of the orifices generally extends in an axial direction relative to the tank and has at least two of the orifices, ii) the second bank of the orifices is disposed between a 7 o'clock position and a 9 o'clock position; and iii) a liquid heat transfer medium is discharged through each of the orifices of the second bank of the orifices.*

*41. A blancher for heating a plurality of food products at the same time comprising:*

*a tank;*

*a food product-receiving chamber that has a food product inlet, a food product outlet, a heat transfer medium, and a plurality of food products received therein, the food product-receiving chamber comprising a perforate drum disposed in the tank into which are disposed the food products;*

*a food product transport mechanism received in the food product-receiving chamber for urging food products in the food product-receiving chamber from adjacent the food product inlet toward the food product outlet, the food product transport mechanism comprising an auger having a plurality of pairs of axially spaced auger flights, wherein the food product transport mechanism is disposed in the perforate drum and rotates in a clockwise direction during operation thereby urging food product from adjacent a food product inlet toward a food product outlet; and*

*an orifice disposed in fluid flow communication with the heat transfer medium from which a fluid under pressure is discharged into the food product-receiving chamber, wherein the orifice includes*

*a first bank of orifices with each of the orifices in fluid flow communication with the tank wherein i) the first bank of the orifices generally extends in an axial direction relative to the tank and has at least two of the orifices, ii) the first bank of the orifices is disposed within about 65° of a centerline that extends perpendicular to horizontal and extends through the center of the perforate drum; and iii) a gas is discharged through each of the orifices of the first bank of the orifices, and*

*a second bank of orifices with each of the orifices in fluid flow communication with the tank, wherein i) the second bank of the orifices generally extends in an axial direction relative to the tank and has at least two of the orifices, ii) the second bank of the orifices is disposed within a band that extends between 45° and 85° of the centerline; and iii) a liquid heat transfer medium is discharged through each of the orifices of the second bank of the orifices.*

*42. A blancher for heating a plurality of food products at the same time comprising:*

*a tank;*

*a food product-receiving chamber that has a food product inlet, a food product outlet, a heat transfer medium, and a plurality of food products received therein, the food product-receiving chamber comprising a perforate drum disposed in the tank into which are disposed food products and a heat transfer medium;*

*a food product transport mechanism received in the food product-receiving chamber for urging food products in the food product-receiving chamber from adjacent the food product inlet toward the food product outlet, the food product transport mechanism comprising an auger having a plurality of pairs of axially spaced auger flights, wherein the food product transport mechanism is disposed in the perforate drum and rotates in a clockwise direction during operation thereby urging food product from adjacent a food product inlet toward a food product outlet; and*

*an orifice disposed in fluid flow communication with the heat transfer medium from which a fluid under pressure is discharged into the food product-receiving chamber, wherein the orifice includes*

*a first bank of orifices with each of the orifices in fluid flow communication with the tank wherein i) the first bank of the orifices generally extends in an axial direction relative to the tank and has at least two of the orifices, and ii) the first bank of the orifices is disposed between a 6 o'clock position and an 8 o'clock position, and*

*a second bank of orifices with each of the orifices in fluid flow communication with the tank, wherein i) the second bank of the orifices generally extends in an axial direction relative to the tank and has at least two of the orifices, and ii) the second bank of the orifices is disposed between a 7 o'clock position and a 9 o'clock position.*

*43. A blancher for heating a plurality of food products at the same time comprising:*

*a tank;*

*a food product-receiving chamber that has a food product inlet, a food product outlet, a heat transfer medium, and a plurality of food products received therein, the food product-receiving chamber comprising a perforate*

*drum disposed in the tank into which are disposed the food products and a heat transfer medium;*

*a food product transport mechanism received in the food product-receiving chamber for urging food products in the food product-receiving chamber from adjacent the food product inlet toward the food product outlet, the food product transport mechanism comprising an auger having a plurality of pairs of axially spaced auger flights, wherein the food product transport mechanism is disposed in the perforate drum and rotates in a clockwise direction during operation thereby urging food product from adjacent a food product inlet toward a food product outlet; and*

*an orifice disposed in fluid flow communication with the heat transfer medium from which a fluid under pressure is discharged into the food product-receiving chamber, wherein the orifice includes*

*a first bank of orifices with each of the orifices in fluid flow communication with the tank wherein i) the first bank of the orifices generally extends in an axial direction relative to the tank and has at least two of the orifices, and ii) the first bank of the orifices is disposed within about 65° of a centerline that extends perpendicular to horizontal and extends through the center of the perforate drum, and*

*a second bank of orifices with each of the orifices in fluid flow communication with the tank, wherein i) the second bank of the orifices generally extends in an axial direction relative to the tank and has at least two of the orifices, and in the second bank of the orifices is disposed within a band that extends between 45° and 85° of the centerline.*

*44. A blancher for heating a plurality of food products at the same time comprising:*

*a perforate food product-receiving chamber that has a food product inlet at one end, a food product outlet at its other end, a liquid heat transfer medium, and a plurality of food products received therein;*

*a tank in which the perforate food product-receiving chamber is disposed;*

*a food product transport mechanism disposed in the food product-receiving chamber for urging food products in the food product-receiving chamber from adjacent the food product inlet toward the food product outlet, the food product transport mechanism comprising an auger having a plurality of pairs of axially spaced auger flights;*

*a plurality of pairs of orifices disposed in fluid flow communication with the heat transfer medium each for discharging a fluid under pressure into the food product-receiving chamber toward the food products; and*

*fluid comprising a gas discharged from each of the orifices at a volumetric flow rate of at least 60 CFM for increasing heat transfer to the food products.*

*45. A blancher for heating a plurality of food products at the same time comprising:*

*a perforate food product-receiving chamber having a food product inlet at one end, a food product outlet at its opposite end, a liquid heat transfer medium, and a plurality of food products received therein;*

*a tank in which the perforate food product-receiving chamber is disposed;*

*a food product transport mechanism that comprises an auger disposed in the perforate food product-receiving chamber for urging food products in the food product-receiving chamber from adjacent the food product inlet toward the food product outlet, the auger having a plurality of pairs of axially spaced auger flights; and*

*a plurality of pairs of orifices disposed in fluid flow communication with the liquid heat transfer medium each for discharging a fluid under pressure into the food product-receiving chamber toward the food products;*

*wherein the liquid heat transfer medium is discharged from each of the orifices at a pressure of at least 30 psi for increasing heat transfer to the food products.*

*46. A blancher for heating a plurality of food products at the same time comprising:*

*a perforate food product-receiving chamber having a food product inlet at or adjacent one end, a food product outlet at or adjacent an opposite end, a liquid heat transfer medium, and a plurality of food products received therein;*

*a tank in which the perforate food product-receiving chamber is disposed;*

*a food product transport mechanism that comprises an auger disposed in the perforate food product-receiving chamber for urging food products in the food product-receiving chamber from adjacent the food product inlet toward the food product outlet, the auger having a plurality of pairs of axially spaced auger flights; and*

*a plurality of pairs of orifices disposed in fluid flow communication with a heat transfer medium each for discharging a fluid under pressure toward the food products;*

*wherein the fluid discharged from each of the orifices is a liquid at a pressure of at least 80 psi.*

*47. A blancher for heating a plurality of food products at the same time comprising:*

*a perforate and tubular food product-receiving chamber having a food product inlet, a food product outlet, and a plurality of food products received therein;*

*a tank that receives the perforate and tubular food product-receiving chamber;*

*a liquid heat transfer medium disposed in the tank and in the perforate and tubular food product-receiving chamber;*

*a food product transport mechanism that comprises an auger disposed in the perforate and tubular food product-receiving chamber for urging food products in the food product-receiving chamber from adjacent the food product inlet toward the food product outlet, the auger having a plurality of pairs of axially spaced auger flights; and*

*a plurality of pairs of orifices disposed in fluid flow communication with a heat transfer medium each for discharging a fluid under pressure toward the food products;*

*wherein the fluid discharged from each of the orifices is a gas at a pressure of at least 2 psi and at a flow rate of at least 100 CFM.*

* * * * *